US011017369B1

(12) United States Patent
Brock et al.

(10) Patent No.: US 11,017,369 B1
(45) Date of Patent: May 25, 2021

(54) CLOUD-BASED INVENTORY AND DISCOUNT PRICING MANAGEMENT SYSTEM

(71) Applicant: Square, Inc., San Francisco, CA (US)

(72) Inventors: Zachary Brock, San Francisco, CA (US); Grace Huey Chen, San Francisco, CA (US); Benjamin Hartard, San Francisco, CA (US); Mark Jen, San Francisco, CA (US); Kathryne Hollie Hawthorne, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 619 days.

(21) Appl. No.: 14/700,013

(22) Filed: Apr. 29, 2015

(51) Int. Cl.
*G06Q 20/20* (2012.01)
*G06Q 30/02* (2012.01)

(52) U.S. Cl.
CPC ......... *G06Q 20/203* (2013.01); *G06Q 20/202* (2013.01); *G06Q 30/0207* (2013.01); *G06Q 30/0238* (2013.01)

(58) Field of Classification Search
USPC ........................................... 705/14.38, 14.24
See application file for complete search history.

(56) References Cited

U.S. PATENT DOCUMENTS

| | | | |
|---|---|---|---|
| 5,057,829 A * | 10/1991 | Velazquez | G06F 13/4072 340/12.32 |
| 5,168,445 A | 12/1992 | Kawashima et al. | |
| 5,765,143 A | 6/1998 | Sheldon et al. | |
| 5,933,813 A * | 8/1999 | Teicher | G06Q 10/087 235/375 |
| 6,151,582 A | 11/2000 | Huang et al. | |
| 6,431,444 B1 * | 8/2002 | Gatto | A47F 9/048 235/375 |

(Continued)

FOREIGN PATENT DOCUMENTS

CA 2 332 083 A1 7/2001

OTHER PUBLICATIONS

Non-Final Office Action dated Apr. 24, 2017, for U.S. Appl. No. 14/700,044, of Brock, Z., et al., filed Apr. 29, 2015.

(Continued)

*Primary Examiner* — Kiersten V Summers
(74) *Attorney, Agent, or Firm* — Lee & Hayes, P.C.

(57) ABSTRACT

Introduced is a technology for processing transactions on behalf of a merchant employing a legacy system, where the processing includes managing inventory data and bundle pricing data associated with transactions occurring at various point-of-sale (POS) devices that include both legacy and non-legacy POS devices. Briefly described, the technology involves a payment processing system (PPS) working in coordination with a legacy merchant system. The PPS includes a payment processing database system, a adapter module installed at the merchant system, and a payment processing engine installed at a cloud-based server system. The payment processing engine, via the adapter module, can receive the most up-to-date inventory data and bundle pricing rules from the legacy merchant system. Based on the bundle pricing rules, the payment processing engine can compute one or more minimum-price carts that apply pricing discounts to eligible items for transactions occurring at the POS device(s) associated with the PPS.

9 Claims, 9 Drawing Sheets

(56) References Cited

U.S. PATENT DOCUMENTS

| | | | |
|---|---|---|---|
| 6,595,342 B1 | 7/2003 | Maritzen et al. | |
| 6,609,101 B1 | 8/2003 | Landvater | |
| 6,687,679 B1 | 2/2004 | Van Luchene et al. | |
| 7,013,290 B2 | 3/2006 | Ananian | |
| 7,092,929 B1 | 8/2006 | Dvorak et al. | |
| 7,222,786 B2 | 5/2007 | Renz et al. | |
| 7,343,319 B1* | 3/2008 | Walker | G06Q 20/202 705/21 |
| 7,552,066 B1 | 6/2009 | Landvater | |
| 7,660,738 B1 | 2/2010 | Siegel et al. | |
| 7,720,708 B1 | 5/2010 | Elkins, II et al. | |
| 7,818,284 B1* | 10/2010 | Walker | G06Q 20/387 705/26.2 |
| 7,882,209 B1* | 2/2011 | Eslambolchi | G06F 9/54 709/223 |
| 7,941,331 B2 | 5/2011 | Dogan et al. | |
| 7,979,299 B1 | 7/2011 | Mehta et al. | |
| 8,001,017 B1 | 8/2011 | Franco | |
| 8,103,538 B2 | 1/2012 | Bamberg et al. | |
| 8,204,799 B1 | 6/2012 | Murray et al. | |
| 8,239,296 B2 | 8/2012 | Itoi et al. | |
| 8,355,954 B1 | 1/2013 | Goldberg et al. | |
| 8,417,572 B1 | 4/2013 | Chenault | |
| 8,438,066 B1 | 5/2013 | Yuen et al. | |
| 8,533,053 B2 | 9/2013 | Brown et al. | |
| 8,650,062 B2 | 2/2014 | Krech | |
| 8,732,040 B1 | 5/2014 | Prabhune et al. | |
| 9,168,315 B1* | 10/2015 | Scaringe | F24F 11/30 |
| 9,323,441 B1 | 4/2016 | Minks-Brown et al. | |
| 9,619,483 B1 | 4/2017 | Robinson et al. | |
| 9,619,831 B1 | 4/2017 | Kumar et al. | |
| 9,659,310 B1 | 5/2017 | Allen et al. | |
| 9,786,005 B1 | 10/2017 | Poursartip et al. | |
| 9,792,597 B1 | 10/2017 | Jen et al. | |
| 10,318,569 B1 | 6/2019 | Funk et al. | |
| 10,339,548 B1 | 7/2019 | Kumar et al. | |
| 10,373,118 B1 | 8/2019 | Lefkow et al. | |
| 10,467,583 B1 | 11/2019 | Jen et al. | |
| 2001/0034722 A1* | 10/2001 | Tidball | G06Q 20/20 705/73 |
| 2001/0042008 A1* | 11/2001 | Hull | G06Q 20/387 705/14.13 |
| 2002/0010661 A1 | 1/2002 | Waddington et al. | |
| 2002/0065839 A1* | 5/2002 | McCulloch | G06Q 20/04 |
| 2002/0072988 A1 | 6/2002 | Aram | |
| 2002/0091595 A1 | 7/2002 | Itoi et al. | |
| 2002/0133368 A1 | 9/2002 | Strutt et al. | |
| 2002/0147656 A1 | 10/2002 | Tam et al. | |
| 2002/0188579 A1* | 12/2002 | Liu | G06N 99/005 706/19 |
| 2003/0006098 A1* | 1/2003 | Wike, Jr. | A47F 9/046 186/61 |
| 2003/0018701 A1* | 1/2003 | Kaestle | H04L 12/4604 709/201 |
| 2003/0026404 A1 | 2/2003 | Joyce et al. | |
| 2003/0033179 A1 | 2/2003 | Katz et al. | |
| 2003/0046133 A1 | 3/2003 | Morley et al. | |
| 2003/0151821 A1* | 8/2003 | Favalora | G02B 26/106 359/619 |
| 2003/0216969 A1 | 11/2003 | Bauer et al. | |
| 2004/0019552 A1* | 1/2004 | Tobin | G06Q 10/087 705/37 |
| 2004/0039639 A1 | 2/2004 | Walker et al. | |
| 2004/0098311 A1* | 5/2004 | Nair | G06Q 10/10 705/26.1 |
| 2004/0153359 A1 | 8/2004 | Ho et al. | |
| 2004/0181753 A1 | 9/2004 | Michaelides | G06F 17/30569 715/249 |
| 2004/0186783 A1 | 9/2004 | Knight et al. | |
| 2004/0267640 A1 | 12/2004 | Bong et al. | |
| 2005/0149414 A1 | 7/2005 | Schrodt et al. | |
| 2005/0250555 A1* | 11/2005 | Richardson | H04B 1/3816 455/572 |
| 2005/0273377 A1* | 12/2005 | Ouimet | G06Q 30/02 705/7.31 |
| 2006/0031085 A1 | 2/2006 | Postel et al. | |
| 2006/0106699 A1* | 5/2006 | Hitalenko | G06Q 20/12 705/35 |
| 2006/0195563 A1 | 8/2006 | Chapin et al. | |
| 2006/0224470 A1* | 10/2006 | Garcia Ruano | G06Q 20/04 705/26.1 |
| 2006/0235726 A1 | 10/2006 | Paraison et al. | |
| 2006/0235739 A1 | 10/2006 | Levis et al. | |
| 2006/0253330 A1 | 11/2006 | Maggio et al. | |
| 2007/0124221 A1 | 5/2007 | Itoi et al. | |
| 2007/0244765 A1 | 10/2007 | Hunter et al. | |
| 2008/0077459 A1 | 3/2008 | Desai et al. | |
| 2008/0082427 A1 | 4/2008 | Gandhi et al. | |
| 2008/0103846 A1 | 5/2008 | Armstrong et al. | |
| 2008/0120206 A1 | 5/2008 | Weiler et al. | |
| 2008/0147507 A1 | 6/2008 | Langhammer | |
| 2008/0191881 A1 | 8/2008 | Minerley | |
| 2008/0198761 A1* | 8/2008 | Murawski | G06Q 10/02 370/254 |
| 2008/0201232 A1 | 8/2008 | Walker et al. | |
| 2008/0216001 A1* | 9/2008 | Ording | G06F 3/044 715/763 |
| 2008/0228582 A1 | 9/2008 | Fordyce et al. | |
| 2008/0281792 A1 | 11/2008 | Pickett et al. | |
| 2008/0301095 A1* | 12/2008 | Zhu | G06F 17/30613 |
| 2009/0089148 A1* | 4/2009 | Gujjar | G06Q 20/20 705/16 |
| 2009/0222337 A1* | 9/2009 | Sergiades | G06Q 30/0239 705/14.23 |
| 2009/0299794 A1 | 12/2009 | Marchi et al. | |
| 2010/0138037 A1 | 6/2010 | Adelberg et al. | |
| 2010/0169130 A1 | 7/2010 | Fineman et al. | |
| 2010/0174596 A1 | 7/2010 | Gilman et al. | |
| 2010/0234986 A1 | 9/2010 | Clopton et al. | |
| 2011/0010448 A1* | 1/2011 | Gill | G06Q 30/02 709/224 |
| 2011/0011931 A1* | 1/2011 | Farley | G06Q 20/20 235/382.5 |
| 2011/0047022 A1 | 2/2011 | Walker et al. | |
| 2011/0054649 A1* | 3/2011 | Sarkis | G09B 5/06 700/94 |
| 2011/0054992 A1 | 3/2011 | Liberty et al. | |
| 2011/0066504 A1 | 3/2011 | Chatow et al. | |
| 2011/0082734 A1 | 4/2011 | Zhang et al. | |
| 2011/0191861 A1 | 8/2011 | Spears | |
| 2011/0213644 A1 | 9/2011 | Phene | |
| 2011/0225023 A1 | 9/2011 | Evens et al. | |
| 2011/0238577 A1* | 9/2011 | Shuster | G06Q 20/10 705/44 |
| 2011/0258083 A1 | 10/2011 | Ren | |
| 2011/0258117 A1* | 10/2011 | Ahmad | G06Q 20/202 705/44 |
| 2011/0313840 A1 | 12/2011 | Mason et al. | |
| 2012/0016758 A1* | 1/2012 | Bouaziz | G06Q 20/20 705/17 |
| 2012/0041675 A1 | 2/2012 | Juliver et al. | |
| 2012/0054076 A1 | 3/2012 | Wu et al. | |
| 2012/0084119 A1 | 4/2012 | Vandehey et al. | |
| 2012/0095882 A1 | 4/2012 | Wolff | |
| 2012/0116810 A1* | 5/2012 | Knowlton | G06Q 10/00 705/3 |
| 2012/0209661 A1 | 8/2012 | Bennett et al. | |
| 2012/0311723 A1 | 12/2012 | Britt, Jr. et al. | |
| 2013/0006742 A1* | 1/2013 | Richard | G06Q 30/0236 705/14.25 |
| 2013/0046634 A1 | 2/2013 | Grigg et al. | |
| 2013/0066698 A1 | 3/2013 | Levy et al. | |
| 2013/0066733 A1 | 3/2013 | Levy et al. | |
| 2013/0124360 A1 | 5/2013 | Mitrovic | |
| 2013/0126610 A1 | 5/2013 | Aihara et al. | |
| 2013/0132140 A1 | 5/2013 | Amin et al. | |
| 2013/0132180 A1 | 5/2013 | Aihara et al. | |
| 2013/0132193 A1 | 5/2013 | Aihara et al. | |
| 2013/0132218 A1 | 5/2013 | Aihara et al. | |
| 2013/0132246 A1 | 5/2013 | Amin et al. | |
| 2013/0132887 A1 | 5/2013 | Amin et al. | |

(56) References Cited

U.S. PATENT DOCUMENTS

| | | |
|---|---|---|
| 2013/0166332 A1 | 6/2013 | Hammad |
| 2013/0169413 A1 | 7/2013 | Schuessler |
| 2013/0173435 A1 | 7/2013 | Cozad, Jr. |
| 2013/0246176 A1 | 9/2013 | Chang et al. |
| 2013/0246207 A1 | 9/2013 | Novak et al. |
| 2013/0246301 A1 | 9/2013 | Radhakrishnan et al. |
| 2013/0282392 A1 | 10/2013 | Wurm |
| 2013/0311211 A1* | 11/2013 | Zafar ............... G06Q 10/02 705/5 |
| 2013/0325672 A1 | 12/2013 | Odenheimer et al. |
| 2014/0012704 A1 | 1/2014 | Mizhen et al. |
| 2014/0025524 A1 | 1/2014 | Sims et al. |
| 2014/0046748 A1 | 2/2014 | Nagarajan et al. |
| 2014/0067596 A1 | 3/2014 | McGovern et al. |
| 2014/0067677 A1 | 3/2014 | Ali et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0149201 A1 | 5/2014 | Abbott et al. |
| 2014/0164126 A1 | 6/2014 | Nichols et al. |
| 2014/0173020 A1 | 6/2014 | Reilly et al. |
| 2014/0180959 A1 | 6/2014 | Gillen et al. |
| 2014/0222711 A1 | 8/2014 | Tibbs et al. |
| 2014/0244416 A1 | 8/2014 | Venkat et al. |
| 2014/0249941 A1 | 9/2014 | Hicks et al. |
| 2014/0279035 A1* | 9/2014 | Fleming ............ G06Q 30/0268 705/14.65 |
| 2014/0279204 A1 | 9/2014 | Roketenetz et al. |
| 2014/0279241 A1 | 9/2014 | Bartholomew et al. |
| 2014/0297470 A1 | 10/2014 | Ramadge et al. |
| 2014/0330685 A1 | 11/2014 | Nazzari |
| 2014/0344118 A1 | 11/2014 | Parpia et al. |
| 2015/0066671 A1* | 3/2015 | Nichols ............... G06Q 20/20 705/18 |
| 2015/0095091 A1 | 4/2015 | Kamdar |
| 2015/0100433 A1 | 4/2015 | Choy et al. |
| 2015/0134552 A1 | 5/2015 | Engels et al. |
| 2015/0161564 A1 | 6/2015 | Sweeney et al. |
| 2015/0161714 A1 | 6/2015 | Fainshtein |
| 2015/0178654 A1 | 6/2015 | Glasgow et al. |
| 2015/0269521 A1 | 9/2015 | Knapp et al. |
| 2015/0278912 A1 | 10/2015 | Melcher et al. |
| 2015/0302510 A1 | 10/2015 | Godsey et al. |
| 2015/0310383 A1 | 10/2015 | Iser et al. |
| 2015/0310397 A1 | 10/2015 | Xu |
| 2015/0332414 A1 | 11/2015 | Unser |
| 2016/0086222 A1 | 3/2016 | Kurapati |
| 2016/0092827 A1 | 3/2016 | Colodny et al. |
| 2016/0275424 A1 | 9/2016 | Concannon et al. |
| 2016/0321677 A1 | 11/2016 | Dobaj |
| 2017/0011423 A1 | 1/2017 | Douglas et al. |
| 2017/0032382 A1 | 2/2017 | Shulman et al. |
| 2017/0236152 A1* | 8/2017 | Dimaunahan ...... G06Q 30/0253 705/14.51 |
| 2017/0345105 A1 | 11/2017 | Isaacson et al. |
| 2018/0025442 A1 | 1/2018 | Isaacson et al. |
| 2018/0150387 A1 | 5/2018 | Kogan et al. |
| 2018/0204256 A1 | 7/2018 | Bifolco et al. |
| 2018/0232817 A1 | 8/2018 | Isaacson et al. |
| 2018/0315111 A1 | 11/2018 | Alvo et al. |
| 2018/0365753 A1 | 12/2018 | Fredrich et al. |
| 2019/0272497 A1 | 9/2019 | Tingler et al. |
| 2019/0287125 A1 | 9/2019 | Kumar et al. |
| 2019/0295148 A1 | 9/2019 | Lefkow et al. |
| 2019/0310126 A1 | 10/2019 | Gurumohan et al. |

OTHER PUBLICATIONS

U.S. Appl. No. 14/700,044 of Brock, Z., et al., filed Apr. 29, 2015.
Final Office Action dated Sep. 6, 2017, for U.S. Appl. No. 14/700,044, of Brock, Z., et al., filed Apr. 29, 2015.
Non-Final Office Action dated Jun. 15, 2017, for U.S. Appl. No. 14/289,467, of Kumar, A., et al., filed May 28, 2014.
Non-Final Office Action dated Jun. 30, 2017, for U.S. Appl. No. 14/522,208, of Cieri, M., et al., filed Oct. 23, 2014.
Final Office Action dated Nov. 22, 2017, for U.S. Appl. No. 14/289,467, of Kumar, A., et al., filed May 28, 2014.
Final Office Action dated Nov. 24, 2017, for U.S. Appl. No. 14/522,208, of Cieri, M.M., et al., filed Oct. 23, 2014.
Non-Final Office Action dated Jan. 26, 2018, for U.S. Appl. No. 14/800,090, of Tsou, V., filed Jul. 15, 2015.
Advisory Action dated Feb. 6, 2018, for U.S. Appl. No. 14/289,467, of Kumar, A., et al., filed May 28, 2014.
Non-Final Office Action dated Apr. 10, 2018, for U.S. Appl. No. 14/700,044, of Brock, Z., et al., filed Apr. 29, 2015.
Non-Final Office Action dated Apr. 18, 2018, for U.S. Appl. No. 14/289,467, of Kumar, A., et al., filed May 28, 2014.
Advisory Action dated Nov. 9, 2017, for U.S. Appl. No. 14/700,044, of Brock, Z., et al., filed Apr. 29, 2015.
Bidgoli, H., "The Internet Encyclopedia", John Wiley and Sons, vol. 1, pp. 2735 (2004), Part 1.
Bidgoli, H., "The Internet Encyclopedia", John Wiley and Sons, vol. 1, pp. 2735 (2004), Part 2.
Bidgoli, H., "The Internet Encyclopedia", John Wiley and Sons, vol. 1, pp. 2735 (2004), Part 3.
Bidgoli, H., "The Internet Encyclopedia", John Wiley and Sons, vol. 1, pp. 2735 (2004), Part 4.
Bidgoli, H., "The Internet Encyclopedia", John Wiley and Sons, vol. 1, pp. 2735 (2004), Part 5.
Bidgoli, H., "The Internet Encyclopedia", John Wiley and Sons, vol. 1, pp. 2735 (2004), Part 6.
Bidgoli, H., "The Internet Encyclopedia", John Wiley and Sons, vol. 1, pp. 2735 (2004), Part 7.
Bidgoli, H., "The Internet Encyclopedia", John Wiley and Sons, vol. 1, pp. 2735 (2004), Part 8.
Bidgoli, H., "The Internet Encyclopedia", John Wiley and Sons, vol. 1, pp. 2735 (2004), Part 9.
Bidgoli, H., "The Internet Encyclopedia", John Wiley and Sons, vol. 1, pp. 2735 (2004), Part 10.
Bidgoli, H., "The Internet Encyclopedia", John Wiley and Sons, vol. 1, pp. 2735 (2004), Part 11.
Bidgoli, H., "The Internet Encyclopedia", John Wiley and Sons, vol. 1, pp. 2735 (2004), Part 12.
Bidgoli, H., "The Internet Encyclopedia", John Wiley and Sons, vol. 1, pp. 2735 (2004), Part 13.
Bidgoli, H., "The Internet Encyclopedia", John Wiley and Sons, vol. 1, pp. 2735 (2004), Part 14.
Bidgoli, H., "The Internet Encyclopedia", John Wiley and Sons, vol. 1, pp. 2735 (2004), Part 15.
Bidgoli, H., "The Internet Encyclopedia", John Wiley and Sons, vol. 1, pp. 2735 (2004), Part 16.
Bidgoli, H., "The Internet Encyclopedia", John Wiley and Sons, vol. 1, pp. 2735 (2004), Part 17.
Chen, F., and Samroengraja, R., "A Staggered Ordering Policy for One-Warehouse, Multiretailer Systems," Operations Research, vol. 48, Issue 2, pp. 281-293 (Apr. 1, 2000).
Cox, J.F., III, and Walker, E.D., II, "The Poker Chip Game: A Multi-product, Multi-customer, Multi-echelon, Stochastic Supply Chain Network Useful for Teaching the Impacts of Pull versus Push Inventory Policies on Link and Chain Performance," Informs Transactions on Education, vol. 6, Issue 3, pp. 3-19 (May 1, 2006).
Ross, D.F., "Replenishment Inventory Planning," Chapter 7 of Distribution Planning and Control: Managing in the Era of Supply Chain Management, Chapman & Hall, pp. 263-319 (1996).
Wah, B.W., "Wiley Encyclopedia of Computer Science and Engineering," Wiley-Interscience, vol. 1, pp. 1-2365 (Nov. 2008).
"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.
Non-Final Office Action dated Jul. 6, 2018, for U.S. Appl. No. 14/800,021, of Tsou, V., filed Jul. 15, 2015.
Final Office Action dated Jul. 26, 2018, for U.S. Appl. No. 14/800,090, of Tsou, V., filed Jul. 15, 2015.
Non-Final Office Action dated Aug. 6, 2018, for U.S. Appl. No. 14/964,231, of Jen, M., et al., filed Dec. 9, 2015.

(56) References Cited

OTHER PUBLICATIONS

Non-Final Office Action dated Aug. 28, 2018, for U.S. Appl. No. 14/522,208, of Cieri, M.M., et al., filed Oct. 23, 2014.
Non-Final Office Action dated Sep. 6, 2018, for U.S. Appl. No. 15/858,911, of Funk, M., et al., filed Dec. 29, 2017.
Non-Final Office Action dated Sep. 14, 2018, for U.S. Appl. No. 14/964,263, of Jen, M., et al., filed Dec. 9, 2015.
Final Office Action dated Sep. 24, 2018, for U.S. Appl. No. 14/700,044, of Brock, Z., et al., filed Apr. 29, 2015.
Advisory Action dated Oct. 30, 2018, for U.S Appl. No. 14/800,090, of Tsou, V., filed Jul. 15, 2015.
Final Office Action dated Nov. 14, 2018, for U.S. Appl. No. 14/289,467, of Kumar, A., et al., filed May 28, 2014.
Advisory Action dated Dec. 5, 2018, for U.S. Appl. No. 14/700,044, of Brick Z., et al., filed Dec. 9, 2015.
Final Office Action dated Jan. 17, 2019, for U.S. Appl. No. 14/964,263, of Mark, J., et al. filed Dec. 9, 2015.
Final Office Action dated Jan. 25, 2019, for U.S. Appl. No. 14/522,208, of Cieri, M.M., et al., filed Oct. 23, 2014.
Notice of Allowance dated Jan. 29, 2019, for U.S. Appl. No. 15/858,911, of Funk, M., et al., filed Dec. 29, 2017.
Final Office Action dated Feb. 4, 2019, for U.S. Appl. No. 14/800,021, of Tsou, V., filed Jul. 15, 2015.
Final Office Action dated Feb. 6, 2019, for U.S. Appl. No. 14/964,231, of Jen, M., et al. filed Dec. 9, 2015.
Notice of Allowance dated Feb. 7, 2019, for U.S. Appl. No. 14/289,467, of Kumar, A., et al. , filed May 28, 2014.
Non Final Office Action dated Sep. 20, 2019, for U.S. Appl. No. 14/800,090, of Tsou, V., filed Jul. 15, 2015.
Advisory Action dated Jun. 22, 2020, for U.S. Appl. No. 14/800,090, of Tsou, V., filed Jul. 15, 2015.
Non Final Office Action dated Jun. 29, 2020, for U.S. Appl. No. 14/964,263, of Jen, M., et al., filed Dec. 9, 2015.
Advisory Action dated Apr. 1, 2019, for U.S. Appl. No. 14/964,263, of Mark, J., et al. filed Dec. 9, 2015.
Advisory Action dated Apr. 22, 2019, for U.S. Appl. No. 14/522,208, of Cieri, M.M., et al., filed Oct. 23, 2014.
Advisory Action dated Apr. 24, 2019, for U.S. Appl. No. 14/800,021, of Tsou, V., filed Jul. 15, 2015.
Advisory Action dated Apr. 30, 2019, for U.S. Appl. No. 14/964,231, of Jen, M., et al., filed Dec. 9, 2015.
Non Final office Action dated May 31, 2019, for U.S. Appl. No. 14/800,021, of Tsou, V., filed Jul. 15, 2015.
Non Final Office Action dated Jun. 14, 2019, for U.S. Appl. No. 14/522,208, of Cieri, M.M., et al., filed Oct. 23, 2014.
Notice of Allowance dated Jun. 20, 2019, for U.S. Appl. No. 14/964,231, of Jen, M., et al., filed Dec. 9, 2015.
Non-Final Office Action dated Jun. 3, 2019, for U.S. Appl. No. 14/700,044, of Brock, Z., et al., filed Apr. 29, 2015.
Non-Final Office Action dated Jul. 30, 2019, for U.S. Appl. No. 14/964,263, of Jen, M., et al., filed Dec. 9, 2015.
Non Final Office Action dated Mar. 19, 2020, for U.S. Appl. No. 16/204,583, of Gjertson, N., et al., filed Nov. 29, 2018.
Final Office Action dated Mar. 20, 2020, for U.S. Appl. No. 14/800,090, of Tsou, V., filed Jul. 15, 2015.
Non Final Office Action dated Mar. 26, 2020, for U.S. Appl. No. 16/431,671, of Kumar, A., et al., filed Jun. 4, 2019.
Advisory Action dated Mar. 30, 2020, for U.S. Appl. No. 14/964,263, of Jen, M., et al., filed Dec. 9, 2015.
Final Office Action dated Dec. 27, 2019, for U.S. Appl. No. 14/522,208, of Cieri, M.M., et al., filed Oct. 23, 2014.
Final Office Action dated Jan. 22, 2020, for U.S. Appl. No. 14/964,263, of Jen, M., et al., filed Dec. 9, 2015.
Final office Action dated Jan. 29, 2020, for U.S. Appl. No. 14/800,021, of Tsou, V., filed Jul. 15, 2015.
Non Final Office Action dated Mar. 10, 2020, for U.S. Appl. No. 16/051,257, of Capers M., et al., filed Jul. 31, 2018.
Non-Final office Action dated Jun. 12, 2020, for U.S. Appl. No. 14/800,021, of Tsou, V., filed Jul. 15, 2015.
Final Office Action dated Jul. 16, 2020, for U.S. Appl. No. 16/051,257, of Capers M., et al., filed Jul. 31, 2018.

* cited by examiner

FIG. 7A

CLOUD-BASED INVENTORY AND DISCOUNT PRICING MANAGEMENT SYSTEM

BACKGROUND

Inventory management is a crucial aspect of doing business for merchants. For merchants who do business at multiple locations, inventory management involves not only the tracking of merchandise sales at different merchant stores (e.g., purchases at various point-of-sale terminals), but also the fast and accurate communication of pricing and associated discounts based on available inventory between the merchant's headquarters to the different locations. Although merchants often have systems in place to handle these functionalities, these systems can quickly become technologically out-of-date and inadequate for their intended purposes as a merchant's business expands. Yet technology upgrades often require extensive infrastructure changes to these systems (i.e., legacy systems), which can be expensive.

BRIEF DESCRIPTION OF THE DRAWINGS

Embodiments of the inventory management technology will be described and explained through the use of the accompanying drawings in which:

FIGS. 7A-7B illustrate examples of graphical user interfaces that can be generated by a point-of-sale (POS) device.

DETAILED DESCRIPTION

Figure 1:
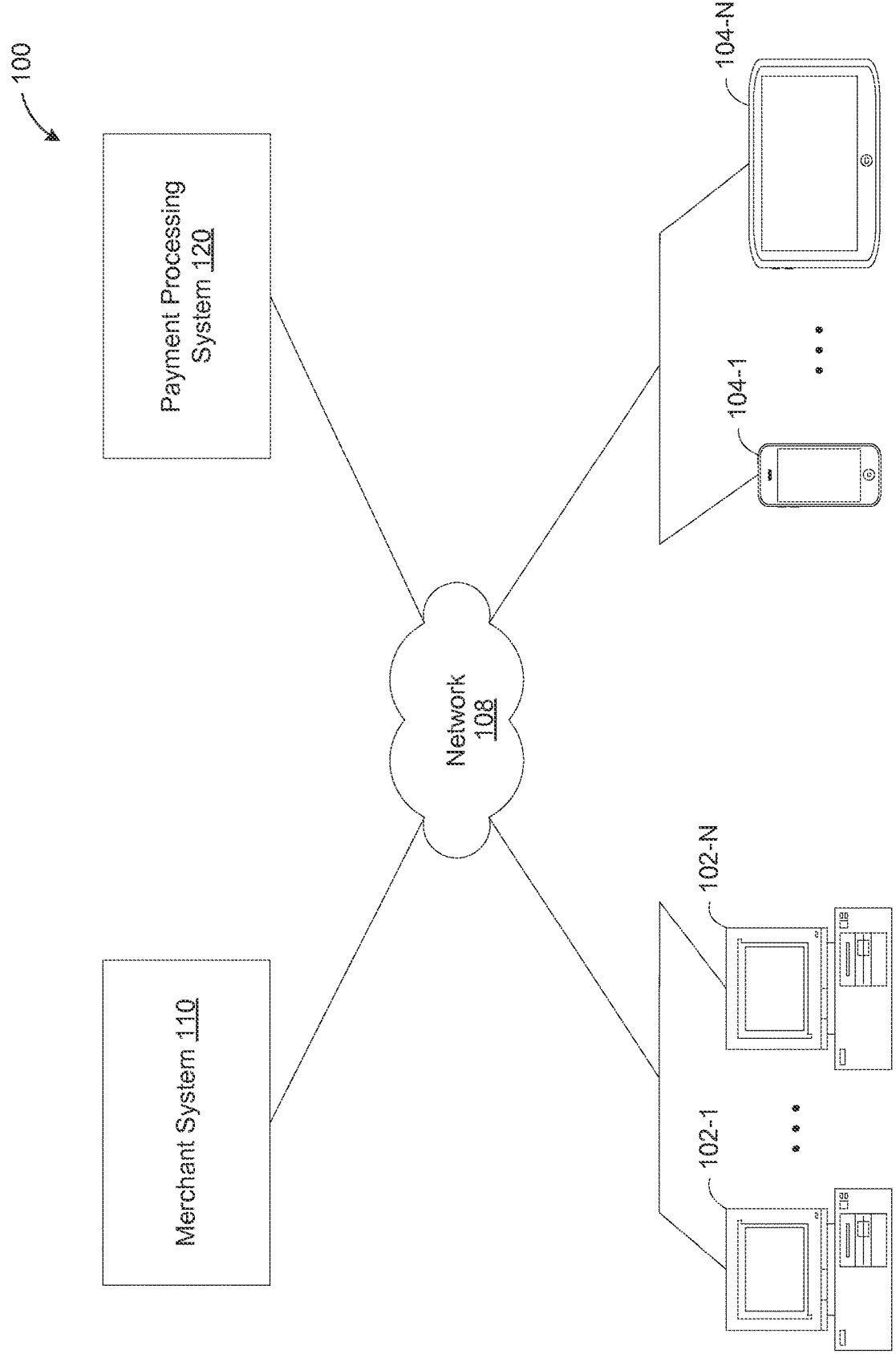
FIG. 1 illustrates an example of a network-based environment in which some embodiments of the inventory management technology can be utilized.

Introduced here is a technology ("the inventory management technology") for processing transactions on behalf of a merchant who employs a legacy computer system for managing inventory, where the processing of transactions includes managing merchandise data associated with transactions occurring at various point-of-sale (POS) devices that include both legacy POS devices and new (i.e., non-legacy) POS devices. Among other benefits as will be discussed further below, the inventory management technology enables the merchant to maintain consistency of merchandise data among both the legacy POS devices and the non-legacy POS devices. As used herein, the term "merchandise data" refers to inventory data and bundle pricing data that includes bundle pricing rules for applying discounts to merchandise items purchased across the various POS devices. As used here, the term "legacy" refers to a computer system or other computing device that maintains a previous or outdated computer architecture that is constructed for a specialized, limited purpose, whose integration with new technologies may necessitate a complete disintegration of the architecture and/or pose significant technical challenges.

In at least some embodiments, the inventory management technology involves a network-based payment processing system (PPS) working in coordination with a legacy computer system of a merchant ("legacy merchant system" or simply "merchant system"). The PPS can be operated by a payment processing service to facilitate, on behalf of the merchant, a processing of customer purchases at one or more POS devices associated with the PPS (i.e., non-legacy POS devices). The PPS can include a payment processing database system (PPDS), an adapter module installed at the merchant system, and a payment processing engine installed at a cloud-based server system. In at least some embodiments, the payment processing engine operates as a communication bridge between the merchant system and the PPS. In particular, in at least some embodiments the payment processing engine receives the most up-to-date inventory data and bundle pricing rules from the legacy merchant system via the adapter module.

The adapter module, which is installed at the legacy merchant system, operates as a mechanism to facilitate communication of data between the legacy merchant system, which can communicate only to the legacy POS devices and/or other legacy systems, and other remote systems and/or devices. In particular, the adapter module translates between the legacy formats, which are traditionally used by the back-end computers of the legacy merchant, and the "modern" or new formats used by the current computer systems of the payment service (e.g., the PSS and/or the mobile devices operating as POS coupled to the PPS). In one example implementation, data is obtained from a cloud-based data store (or database system) and transmitted to the adapter module using Protocol Buffers (e.g., by payment processing engine); the adapter module turns the data into a CSV formatted file that the legacy merchant system can interpret. The implementation can also work in the other direction, where the adapter can obtain a legacy formatted CSV, translate it into protocol buffers, and send, or cause it to be sent, to the cloud-based data store for storage (e.g., data is sent to the payment processing engine residing at the server associated with the data store). Note that Protocol Buffers is just one example of formats that can be utilized in the inventory management technology. As used here, the term "Protocol Buffers" refer to a method of serializing structured data that can be useful in developing programs to communicate with each other over a wire or for storing data. The method involves an interface description language that describes the structure of some data and a program that generates source code from that description for generating or parsing a stream of bytes that represents the structured data. Use of protocol buffers can be ideal in certain situations for communicating large amounts of data between clients and servers while minimizing the amount of information you have to transmit, simplifying updates to how they communicate and providing clear documentation of the interface between the two.

In embodiments of the inventory management technology, the adapter module receives commands and/or instructions from the payment processing engine, which cannot otherwise communicate with the legacy merchant system, and translates those commands and/or instructions and executes them at the legacy merchant system. For example, the adapter module, based on a request from the payment processing engine, can access a database system associated with the legacy merchant system to retrieve the up-to-date inventory data and bundle pricing rules for transmission to the payment processing engine. Using the bundle pricing rules retrieved by the adapter module, the payment processing engine can compute one or more "minimum-price carts" that apply pricing discounts to eligible items in virtual shopping carts of transactions occurring at the POS device(s) associated with the PPS. Furthermore, the adapter module can receive data (e.g., post-sales transaction data or "post-transaction data") from the payment processing module, and communicate that data to the legacy merchant system such that the system can update its inventory data stored at the database system associated the legacy merchant system. Using this post-transaction data, the legacy merchant system can reconfigure the bundle pricing rules based on the updated inventory data.

Consider, as an example, that the merchant is a clothing retailer company, or simply a "retailer service". A retailer service may offer a large inventory of inventory items (e.g., hundreds of thousands of clothing articles) in different categories (e.g., clothing departments) for purchase at a large number of retailer stores. A retailer service such as this generally utilizes a legacy computer system to maintain merchandise data for items being offered at multiple legacy POS devices located at different retailer stores. The merchandise data, as discussed above, can include inventory data associated with inventory items of a particular store and bundle pricing data that include bundle pricing rules for applying discounts to the inventory items. The legacy computer system generally includes a centralized server computer system (e.g., at the retailer's headquarters) that communicates with one or more local computer servers, each located at and servicing a particular retailer store and that store's legacy POS devices. In particular, a local computer server communicates merchandise data back and forth between the legacy POS devices and the centralized server computer system. An example of such a local computer server is shown as location system 320 of FIG. 3. An example of such a centralized server computer system is shown as POS database system 310 of FIG. 3.

As its business expands and newer POS devices and newer payment processing implementations become available, the retailer service desires to take advantage of the new technological advancements. However, because the legacy computer system has been in place for a long time, and has to maintain a large amount of data, a transition to a completely new inventory management system is highly burdensome, expensive, and technologically challenging. The alternative to a complete replacement of the legacy computer system is integration with new systems. Integration can also be problematic, however, as merchandise data maintained by the retailer service needs to be updated across both the new POS devices and the legacy POS devices. As a result, distribution of the merchandise data by the legacy computer system to the new POS devices can be slow and prone to technical errors (e.g., software bugs). Accordingly, any solutions for the retailer service must balance the need for a robust infrastructure as well as the need for simplicity of execution that provides seamless integration between legacy systems and non-legacy systems.

The inventory management technology introduced here efficiently integrates with a legacy merchant system to process transactions on behalf of a retailer service, by use of the payment processing engine in communication with the adapter module, without the need for drastic infrastructure changes. Referring back to the example, a customer makes a purchase of one or more inventory items at a POS device associated with the PPS (e.g., the customer is at the "checkout" with a proposed purchase). Such proposed purchase by the customer results in a set of operations carried out by various components and/or systems of the PPS (e.g., the operations discussed in reference to FIG. 2).

Figure 7A:
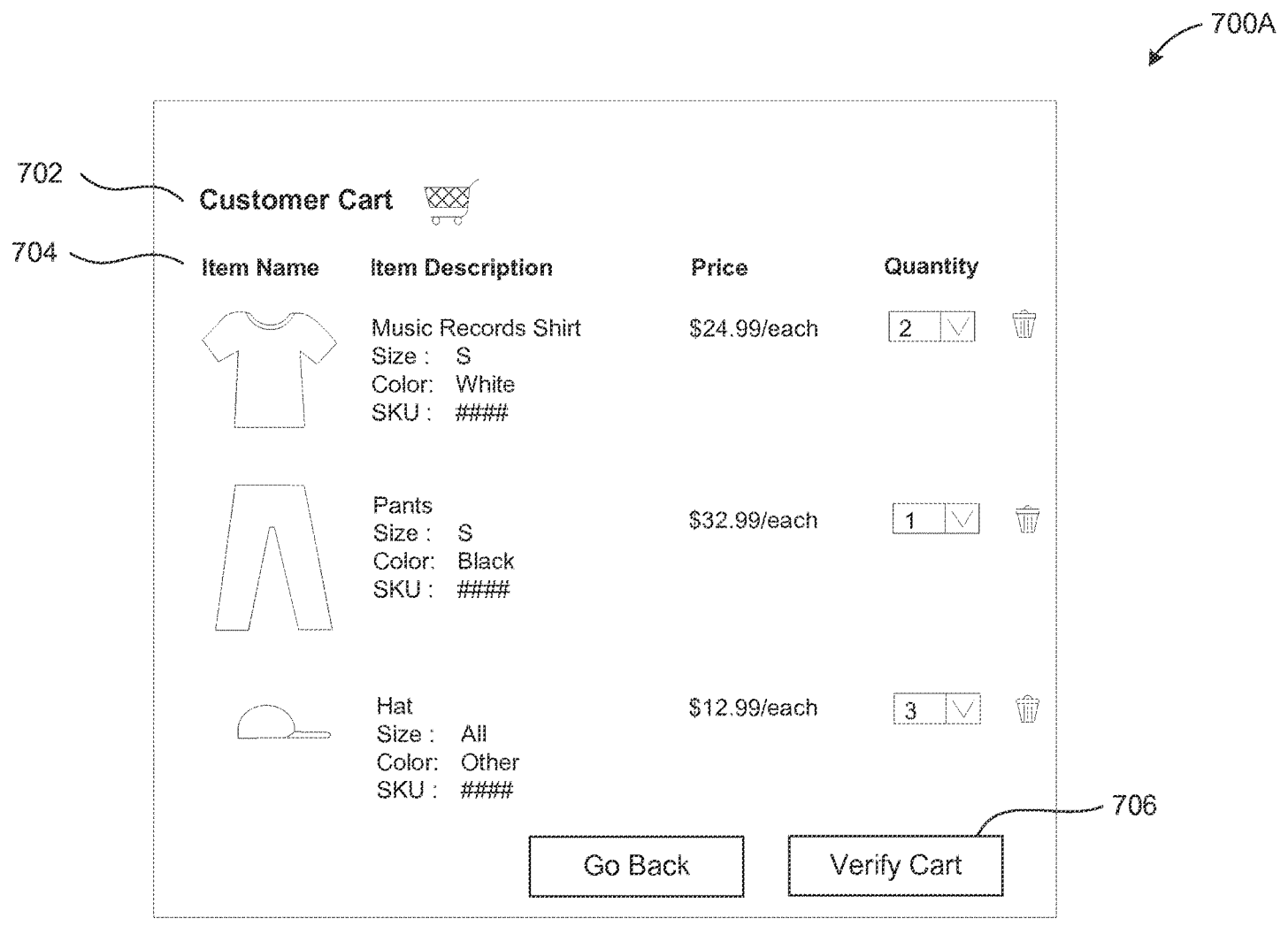

In a first operation, the POS device sends to the PPDS pre-sale transaction data ("pre-transaction data") associated with the one or more inventory items being purchased. The pre-transaction data includes information about the items in the customer's virtual shopping cart. A "virtual shopping cart" as used here refers to one or more inventory items selected in a customer's proposed purchase at the POS device. The virtual shopping cart can be generated, for example, on a display of the POS device when a sales employee, for example, scans barcodes or Quick Response (QR) codes of the inventory items into the POS device. An example of the virtual shopping cart is shown in FIG. 7A.

The PPDS, upon receiving the pre-transaction data, forwards it in a request message to the payment processing engine, to request that a minimum-price cart be generated for the virtual shopping cart. In some embodiments, the POS device sends the pre-transaction data directly to the payment processing engine. In other embodiments, the payment processing engine, which has access to the most up-to-date bundle pricing rules (received via the adapter module), calculates a minimum-price cart for the customer based on the bundle pricing rules. The bundle pricing rules specify discount pricings for one or more discount pricing bundles (groups) of inventory items. The minimum-price cart is a particular discount pricing bundle of items selected for eligible items in the customer's virtual shopping cart, where the discount pricing bundle includes a discount for those eligible items. For example, assume that the customer has decided to purchase three shirts at a regular price of $12.99. The payment processing engine can identify a discount bundle rule that specifies that a bundle of three shirt X qualifies for a discount of "$30 for 3" (i.e., the discount pricing bundle). Further details regarding the identification of an applicable discount bundle rule will because below at least in reference to FIG. 2.

Upon identifying the discount bundle rule, the payment processing engine can apply the discount bundle rule to the customer's three shirts based on the fact that the shirts necessary for that bundle are included in the transaction. In particular, the payment processing engine can send the minimum-price cart back to the PPDS for transmission to the POS device. The minimum-price cart can be in the form of new data that gets transmitted, or pushed, to the PPDS, which then transmits that data to the POS device. In other embodiments, the payment processing engine sends the minimum-price cart directly to the POS device. In such embodiments, the minimum-price cart can be in the form of updated data about the virtual shopping cart that gets transmitted, or pushed, by the payment processing engine to the POS device. Having the minimum-price cart computed by the payment processing engine, as opposed to the POS device for example, relieves the POS device from having to perform any heavy computations. Furthermore, the retailer service (and the POS device) can rest assured that the computed minimum-price cart is current since the payment processing engine maintains the most up-to-date information available from the legacy merchant system.

In some embodiments, where the transaction is an online transaction, the payment processing engine, which has the most up-to-date inventory data, can also verify that the items being purchased are indeed available in the retailer's inventory. In such embodiments, the online transaction can occur, for example, at a website on a web browser executing on a computing device.

Among other benefits, the inventory management technology enables the retailer service to maintain accurate inventory data and apply discount pricing rules across both legacy POS devices and new POS devices. Furthermore, with the new POS devices, having the discount pricing rules implemented by the payment processing engine, as opposed to any of those POS devices for example, relieves each individual POS device from having to perform any heavy computations. Since communication of the up-to-date inventory data and discount pricing rules can be accomplished by integration of the adapter module, the legacy merchant system can remain intact without need for drastic infrastructure changes. Furthermore, because information can be communicated from the legacy merchant system to any remote systems via the adapter module and the payment processing engine, the inventory management technology enables integration with as many new POS devices and/or systems as desired based on the expansion needs of the retailer service.

It is noted the inventory management technology can be used for any merchant system implementation that requires management of inventory and pricing associated with a large inventory of items (e.g., hundreds of thousands of items). Further, while, for convenience, various embodiments of the inventory management technology are described with reference to a retailer service, in other embodiments, the inventory management technology is equally applicable to various other types of merchant (e.g., perishable goods merchant) or any service that requires seamless communication of a large amount of data between legacy and non-legacy systems.

Moreover, the technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

In this description, the terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "module," or "engine" refers broadly to general- or special-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The phrases "in some embodiments," "according to some embodiments," "in the embodiments shown," "in other embodiments," and the like generally mean the particular feature, structure, or characteristic following the phrase is included in at least one implementation of the inventory management technology, and may be included in more than one implementation. In addition, such phrases do not necessarily refer to the same embodiments or different embodiments. Furthermore, if the specification states a system, a component, or a feature "may", "can", "could", or "might" be included or have a characteristic, that particular component or feature is not required to be included or have the characteristic.

FIG. 1 illustrates an example of a network-based environment 100 in which some embodiments of the inventory management technology can be utilized. The embodiments illustrated in FIG. 1 show client devices 102-1-102-N and 104-1-104-N, a legacy merchant system 110, a payment processing system (PPS) 120 ("PPS 120"), and a network 108.

The client devices 102-1-102-N ("legacy POS devices 102-1-102-N) can each be any conventional POS system capable of processing purchase transactions associated with the legacy merchant system 110. An example of a legacy POS device 102 is an NEC® POS Terminal. The legacy POS devices 102-1-102-N can be configured to communicate via the network 108 with the legacy merchant system 110. In some embodiments, the legacy POS devices 102-1-102-N can retrieve or submit information (e.g., inventory data, pricing data, transaction data, etc.) to the legacy merchant system 110 and run one or more applications (e.g., a legacy point-of-sale application) with customized content retrieved from the legacy merchant system 110. For example, the legacy POS devices 102-1-102-N can execute a customized client to enable receiving inventory data and/or pricing data from the legacy merchant system 110, or transmitting pre-transaction and/or post-transaction data to the legacy merchant system 110.

The client devices 104-1-104-N are associated with the PPS 120, and each can be any computing device capable of receiving user input as well as transmitting and/or receiving data via the network 108. The client devices 104-1-104-N can be conventional computer systems (e.g., a desktop or a laptop computer) or mobile computing devices having computer functionality (e.g., a tablet device, a mobile telephone, or a smart-phone). An example of a client device 104 is a mobile computing device such as a tablet computer (e.g., an Apple® iPad®) or smartphone (e.g., an Apple® iPhone®). In some embodiments, the client device 104 can run one or more applications with customized content retrieved from and/or transmitted by the PPS 120, where the one or more applications enable the client device 104 to operate as a POS terminal for a merchant ("POS device 104" or "non-legacy POS device 104"). For example, the POS device 104 can execute a browser application and/or a customized client to retrieve or submit information (e.g., inventory data, pricing data, pre-transaction data, post-transaction data, etc.) from and/or to the PPS 120.

The network 108 can include any combination of local area and/or wide area networks, and wired and/or wireless communication systems. In one embodiment, network 108 uses standard communications technologies and/or protocols. Thus, network 108 may include links using technologies such as Ethernet, IEEE 802.11/WiFi based communications, worldwide interoperability for microwave access (WiMAX), 3G, 4G, CDMA, digital subscriber line (DSL), etc. Similarly, the networking protocols used on network 108 may include, for example, multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 108 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The merchant system 110 can include one or more computer servers used to manage merchandise data relating to items offered for sale at various merchant stores of a merchant. As discussed above, the merchandise data can include inventory data of inventory items and bundle pricing rules associated with the inventory items. The inventory data of a particular inventory item can include, for example, an item name, an item descriptions, an item price, and an item Stock Keeping Unit (SKU). In some embodiments, the inventory data can include other identifying information associated with the particular item, such as an item category (e.g., product category), an item location or "merchant location" (e.g., a physical inventory location at which the item is being held such as a physical store), an image of the item, an item history (e.g., return status, transit information, etc.), and the like.

The merchant system 110 maintains a "master" copy of the merchandise data, which can get distributed to the legacy POS devices 102-1-102-N to enable each legacy POS device to have the most recent, or up-to-date, information. The legacy merchant system 110 can receive transaction data and/or inventory data from each of the legacy POS devices 102-1-102-N to maintain an accurate master copy of the merchandise data. For example, at the end of every business day, the legacy POS device 102 sends the legacy merchant system 110 a report of purchases, which can be used by the legacy merchant system 110 to update the master copy of the merchandise data. For example, based on the number of items sold, the legacy merchant system 110 can adjust the bundle pricing rules (e.g., "No more discount for Item X which is a popular sales item"). In another example, based on the number of items sold, the legacy merchant system 110 can update its inventory of the available of its merchandise (e.g., Item X sold out at all stores on the West Coast). As will be discussed in further detail below, the legacy merchant system 110 can also receive transaction data and/or inventory data from each of the POS devices 104-1-104-N via the facilitation of the PPS 120. Furthermore, through the PPS 120, the master copy of the merchandise data can get distributed to the POS devices 104-1-104-N.

The PPS 120 can include can one or more secure servers. In some embodiments, the PSS 120 includes a secure database server (e.g., PPDS 222 of FIG. 2) that maintains data for facilitating the processing of transactions occurring at the POS devices 104-1-104-N. The data can include, for example, merchandise data, transaction data, including pre-transaction data (e.g., shopping cart items) and post-transaction data (e.g., purchased items), financial account data (e.g., credit card numbers), user account data (e.g., email addresses or phone numbers), or the like. In some embodiments, the PPS 120 includes a secure processing server (e.g., server 226 of FIG. 2) for performing computations and processing of data for the POS devices 104-1-104-N. In some embodiments, such processing server is a cloud-based server operated by a content delivery network service provider, or "cloud service provider."

Figure 2:
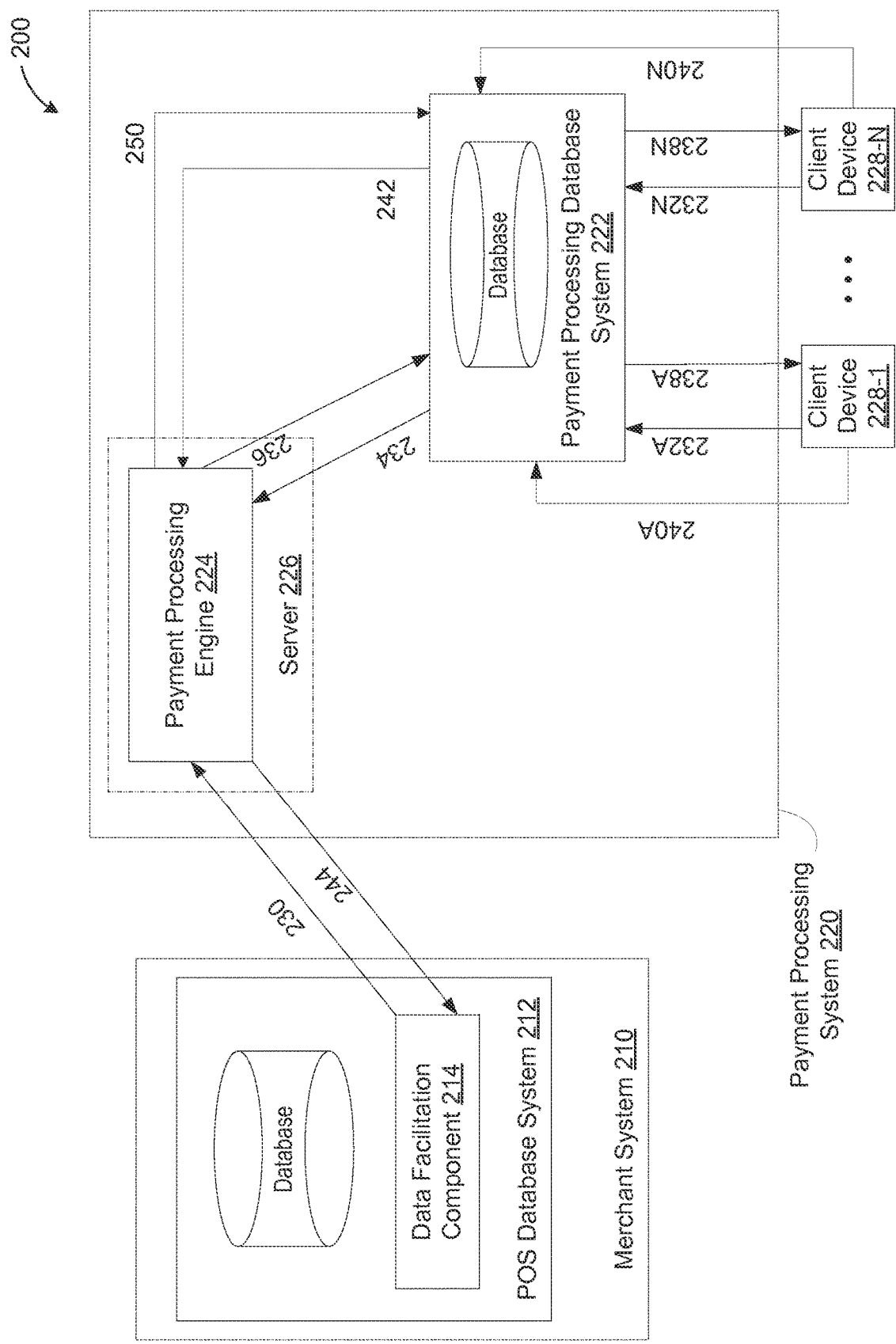
FIG. 2 illustrates schematically a system and process in which inventory data and bundle pricing data are maintained for POS devices by a payment processing system on behalf of a legacy merchant system.

In some embodiments, the processing server communicates with the database server via an application (e.g., payment processing engine 222 of FIG. 2). Such application can be executing at the cloud-based server, where the application is configured to receive instructions and/or data from the PPS 120 for performing various functionalities on behalf of the PPS 120. As will be discussed in more detail below, the application can, on behalf of the merchant system 110, facilitate the distribution of the merchandise data to the POS devices 104-1-104-N and compute one or more minimum price carts for the POS devices 104-1-104-N.

FIG. 2 illustrates schematically a system and process 200 in which inventory data and bundle pricing data are maintained for (non-legacy) POS devices by a payment processing system 220 on behalf of a legacy merchant system 210 in accordance with some embodiments of the inventory management technology. In some embodiments, the legacy merchant system 210 ("merchant system 210") is the merchant system 110 of FIG. 1. In some embodiments, the payment processing system 220 ("PPS 220") is the PPS 120 of FIG. 1.

The PPS 220 is operated by a payment processing service on behalf of a merchant to facilitate transactions executing at one or more client devices 228A-228N. The PPS 220 can include one or more server computer systems employed to facilitate the processing of transactions and/or other commercial functions associated with the transactions via a network (e.g., the network 108 of FIG. 1). In accordance with the embodiments of FIG. 2, the PPS 220 includes a payment processing database system 222 ("PPDS 222"), a adapter module 214, and a payment processing engine 224. The PPDS 222 can be a server computer system that includes at least a processor, a memory, and one or more databases for storing transaction data associated with the transactions, logistics, payment and/or billing information, and/or other data associated with payments processed in the transactions (e.g., inventory, pricing, etc.). In some embodiments, the PPDS 222 operates as a datacenter for managing data utilized and/or generated by the client devices 228A-228N in the one or more databases associated with the PPDS 222.

The payment processing engine 224 can be executing, or running, on one or more servers 226. In some embodiments, the payment processing engine 224 is an application executing on the server(s) 226. In some embodiments, the server(s) 226 can be operated by a cloud service provider that provides utilization of the server(s) 226 to the payment processing service. In some embodiments, the server(s) 226 can be one or more servers of the PPS 220. In the embodiments of FIG. 2, the payment processing engine 224 is used as a communication bridge between the merchant system 210 and the PPS 220, thereby enabling communication between the merchant system 210 and the client devices 228A-228N facilitated by the PPS 220. In particular, the payment processing engine 224 is operatively coupled to the merchant system 210 through the adapter module 214 (which will be discussed in more details below). The payment processing engine 224 can facilitate transmission of data between the adapter module 214 and the PPDS 222. The payment processing engine 224 can also facilitate transmission of data between the client devices 228A-228N and the adapter module 214.

In accordance with the embodiments of FIG. 2, the merchant system 210 includes a POS database system 212. The POS database system 212 can be one or more server computers or work stations that are employed by a merchant for managing inventory, logistics and/or other commercial functions via a network (e.g., the network 108 of FIG. 1). The POS database system 212 typically includes at least one processor and a memory. The POS database system 212 is also typically equipped with or is coupled to one or more databases for storing data associated with the merchant's business, such as purchase transactions, customer information, payment and/or billing information, and/or other information for processing the purchase transactions occurring at various merchant locations or stores (e.g., pricing, inventory, etc.).

In some embodiments, the POS database system 212 operates as a datacenter that maintains a "master" copy of the inventory data and the bundle pricing data (i.e., merchandise data) in the one or more databases. As discussed above, the master copy of the merchandise data can get distributed to the legacy POS devices 102-1-102-N (by the POS database system 212) and the POS devices 104-1-104-N (by the adapter module) such that each POS device has the most recent, or up-to-date, information. Furthermore, each POS device can send reporting information back to the merchant system 210 for updating the master copy of data. In particular, the POS database system 212 facilitates the distribution and the reporting of data to and from the legacy POS devices, while the PPS 220 facilitates those processes to and from the (non-legacy) POS devices on behalf of the merchant system 210.

In accordance with the embodiments of FIG. 2, the adapter module 214 is installed at the POS database system 212. The adapter module 214 is configured to transmit data from the merchant system 110 to remote systems, such as the PPDS 222 and/or the payment processing engine 224. In some embodiments, the adapter module 214 can be a light-weight application installed on the POS database system 212. In some embodiments, such application operates as a software adapter for communicating with the POS database system 212 to retrieve stored data from the POS database system 212 and/or submit new data to the POS database system 212. The application can be a light-weight, cross-platform application that can be implemented in any target platform environment (e.g., the POS database system 212). Such an application is needed to enable the merchant system 210 to communicate with the PPS 220, by virtue of facilitating the transmission of data between the two systems, which otherwise would not be able to communicate. In particular, the adapter module 214 is operatively coupled to the payment processing engine 224 to transmit the stored data from the merchant system 210 to the PPS 220 and to receive the new data from the PPS 220 (for updating the merchant system 210).

Operation of the system is now further described with reference to FIG. 2. At operation 230, the adapter module 214 sends the most up-to-date merchandise data, retrieved from the POS database system 212, to the payment processing engine 224. In some embodiments, the adapter module 214 is configured to send the merchandise data periodically (e.g., every hour, daily, weekly, monthly, etc.). The time period can be configured by an operator of the merchant system 210, the payment processing system 220, a legacy POS device (not shown), a POS device (i.e., non-legacy) such as a client device 228, or a combination thereof. As discussed above, the merchandise data includes inventory data and bundle pricing data. The inventory data includes information about an inventory of items available at various stores of the merchant. The bundle pricing data includes bundle pricing rules that can be applied to inventory items in a proposed purchase of a customer. The payment processing engine 224 stores the merchandise data locally such that it is available for replying to data requests (e.g., requests from the client devices 228A-228N or the PPDS 222).

At operations 232A-232N, the client devices 228A-228N respectively send pricing requests to the PPDS 222. The client devices 228A-228N are POS devices managed by the PPS 220 for executing purchase transactions on behalf of the merchant. For example, each client device 228 is physically located at a merchant store at which a sales employee scans inventory items into a virtual customer shopping cart that is generated on a display of the client device 228. An example of such a display showing the virtual shopping cart is illustrated in FIG. 7A. The client device 228 sends the information associated with the virtual shopping cart, i.e., pre-transaction data, to the PPDS 222. Note that in some embodiments, the client devices 228A-228N can each send the pricing request directly to the payment processing engine 224.

At operation 234, the PPDS 222 forwards the pre-transaction data to the payment processing engine 224 as a request to provide prices, and more particularly, a request to provide a minimum-price cart with any applicable discounts applied to the prices of inventory items in the customer's proposed purchase. The payment processing engine 224 accesses the locally stored bundle pricing rules (previously received from the adapter module 214) and performs one or more computations to generate the minimum-price cart for the customer.

In some embodiments, generating the minimum-price cart includes first determining a set of one or more potential pricing bundles for each item in the virtual shopping cart. In particular, the payment processing engine 224 determines each potential pricing bundle by identifying whether the virtual shopping cart has available all of the items required by a bundle pricing rule for that potential pricing bundle. For example, a bundle pricing rule specifies that Hat X has a discounted price $10 (where the regular price is $12) if Hat X is "bundled", or bought together, with Shirt Y. In this example, the payment processing engine 224, upon first identifying Hat X, would search for Shirt Y (or vice versa) in order to satisfy the bundle pricing rule before applying the discount to Hat X. If Shirt Y is identified, the payment processing engine 224 proceeds to the next bundle pricing rule that is applicable to Hat X (to identify the next potential pricing bundle). For example, another bundle pricing rule specifies a discount of $5 for Hat X if Hat X is bundled with 5 other Hat X's. The payment processing engine 224 continues determining all potential pricing bundles applicable to Hat X, and continues to do so until every item in the virtual shopping cart has been analyzed (e.g., Hat Y, Sock Z, etc.).

Next, the payment processing engine 224 determines a maximum potential discount for each item if all of the potential pricing bundles are applied. Based on the maximum potential pricing discount for each item, the payment processing engine 224 generates and assigns a ranking for each item. For example, even though Hat X qualifies for two different pricing bundles, the pricing bundle with the $5 discount provides the most savings to the customer. As a result, the potential pricing discount of the latter bundle is selected for Hat X. However, Pants Z is eligible for a bundle that needs Hat X, where Pants Z has a maximum potential pricing discount of $10 if bundled with Hat X. Accordingly, the bundle of Pants Z with Hat X is ranked the highest, and as such, that bundle is selected for the virtual shopping cart of the customer.

Figure 7B:
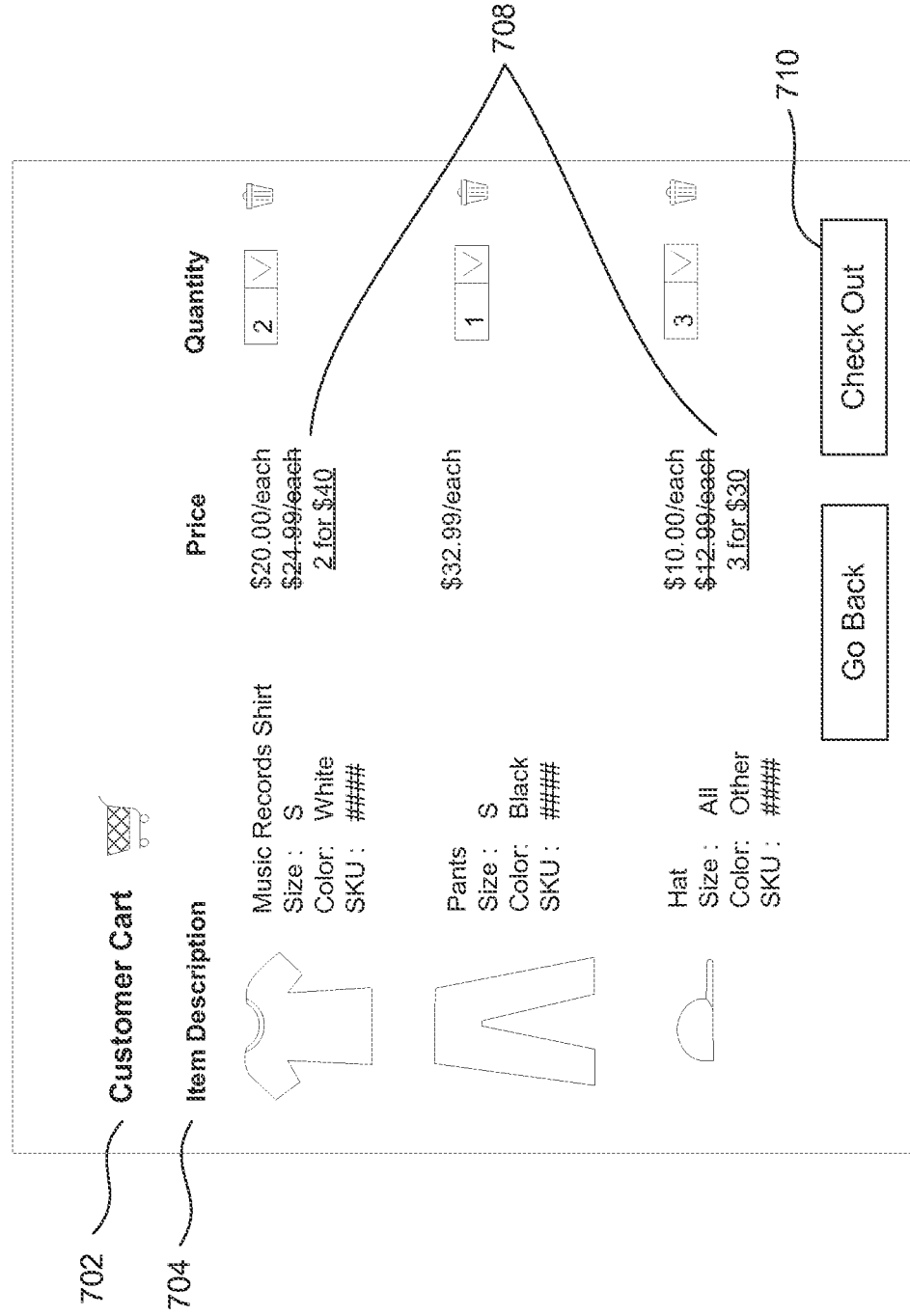

At operation 236, the payment processing engine 224 sends the result of the bundle analysis to the PPDS 222, which forwards the result to a corresponding client device 228 (that has requested the minimum-price cart), as indicated by operation 238. In some embodiments, the payment processing engine 224 sends the result directly to the client device 228. In some embodiments, the result is sent in the form of data for populating a new shopping cart for the customer. For example, the client device 228 uses the information it receives to generate a new version of the virtual shopping cart, where the new version includes updated pricing information on a display for the sales employee. An example of such a display is illustrated in FIG. 7B.

In some embodiments, the client devices 228A-228N send post-sale transaction data (or post-transaction data) to the PPDS 222, as indicated by operations 240A-240N. The PPDS 222 forwards this data to the payment processing engine 224, as indicated by operation 242. At operation 244, the payment processing engine 224 forwards the data to the merchant system 210 via communication with the adapter module 214 to enable updating of the master copy of the inventory data at the merchant system 210. In some embodiments, the payment processing engine 224 generates updated inventory data based on the inventory data and the post-transaction data before transmission to the legacy merchant system 210. In such embodiments, the payment processing engine 224 sends a processed version of the post-transaction data for updating the inventory data stored at the POS database system 212.

In some embodiments, the payment processing engine 224 not only maintains a local copy of the inventory data received from the merchant system 210, but also sends the inventory data to the PPDS 222, as indicated by operation 250. The PPDS 222, in turn, can push the inventory data to the client devices 228A-228N. The client devices 228A-228N, as a result, can have the most up-to-date information about the merchant's inventory items. In some embodiments, the payment processing engine 224 sends the inventory data directly to the client devices 228A-228N. In some embodiments, the payment processing engine 224 simply maintains its copy of the inventory data locally, without forwarding the data to the client devices 228A-228N and/or the PPDS 222.

In some embodiments, prior to determining the minimum-price cart upon request of a particular client device 228, the payment processing engine 224 performs an additional step of verifying that the transaction items in the shopping cart are available for purchase based on the inventory data (received via the adapter module 214). The verifying can include comparing the transaction items with the inventory data to see if the transaction items are still available (e.g., unidentified item or item no longer in inventory). This can be useful, for example, in a scenario of an online purchase transaction with an online shopping cart.

In some embodiments, the payment processing engine 224 precomputes one or more minimum-price carts based on the discount bundle rules received via the adapter module 214, and transmits the minimum-price carts data to the client devices 228A-228N without being prompted with a request (i.e., pushes the minimum-price carts data. In such embodiments, each minimum-price cart includes a discount pricing bundle for eligible transaction items in a theoretical proposed purchase transaction that may be conducted at a POS device. Such computations can be compiled, for example, in an index that can be readily accessible by a POS device to execute the computation of bundles "on-the-fly," i.e., at the time of a transaction, without having to wait for a response from the payment service engine 224 and/or the PPDS 222. In some embodiments, the pre-computed minimum-price carts can be transmitted to the PPDS 222 for storage. In such embodiments, the PPDS 222 can service the requests from the client devices 228A-228N, as opposed to the payment processing engine 224.

Figure 3:
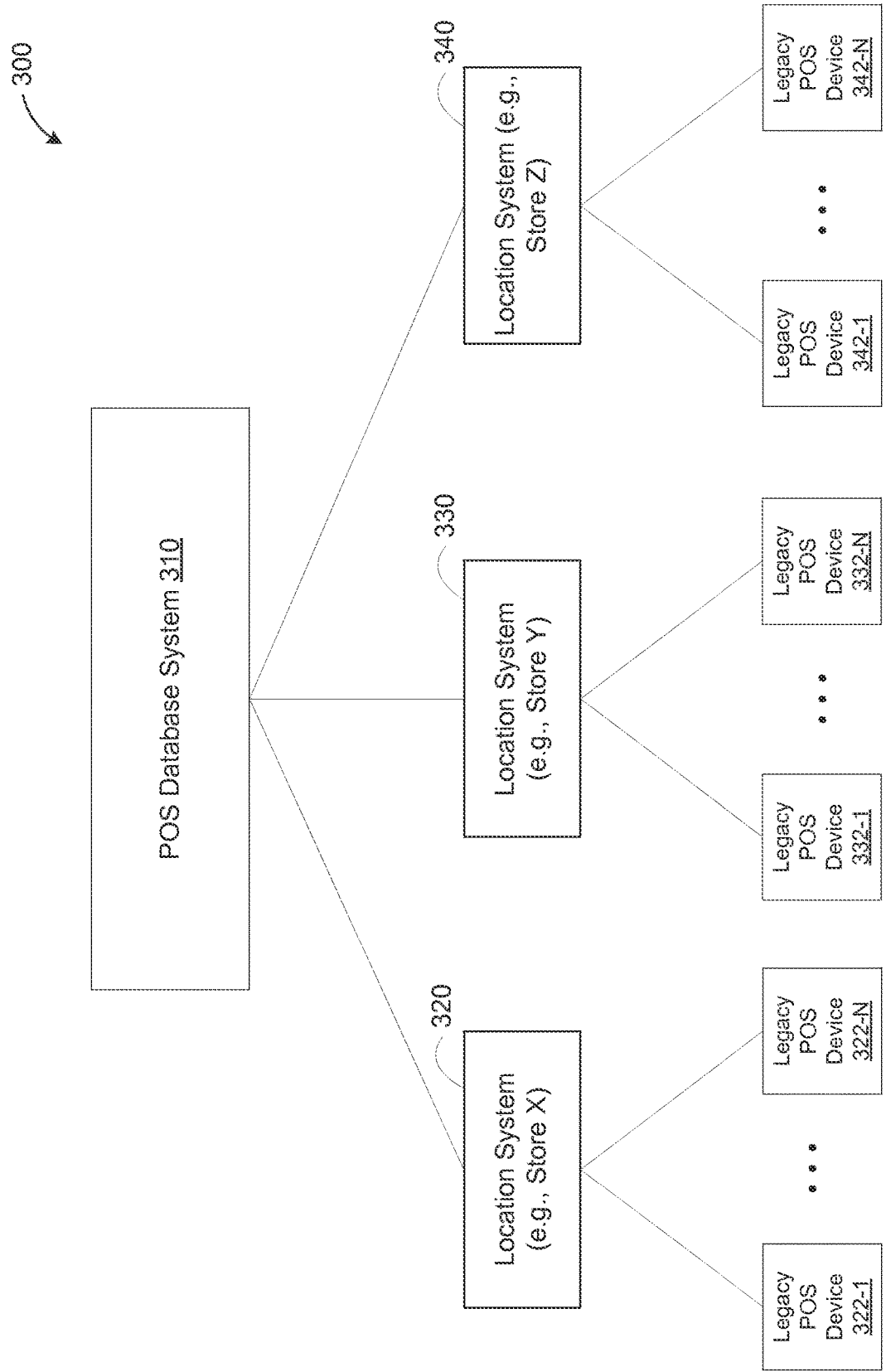
FIG. 3 illustrates an example of a merchant system.

FIG. 3 illustrates an example of a legacy merchant system 300 in accordance with some embodiments of the inventory management technology. In some embodiments, the legacy merchant system 300 ("merchant system 300") can be the merchant system 210 of FIG. 2. FIG. 3 shows a point-of-sale (POS) database system 310 in communication with three database systems 320, 330, and 340. In some embodiments, the POS database system 310 can be the POS database system 212 of FIG. 2. The POS database system 310 is configured to maintain a master copy of the inventory data and the bundle pricing data in one or more databases, and to distribute the data to the three database systems 320, 330, and 340. The three database systems 320, 330, and 340 are configured to manage inventory, logistics and/or other commercial functions via a network for the items sold at three merchant locations corresponding to the database systems 320, 330, and 340 ("location system 320", "location system 330," and "location system 340").

In accordance with the embodiments of FIG. 3, the location system 320 can be one or more server computers or work stations that are employed by a merchant for managing one or more legacy POS devices 322A-322N located at a particular merchant location (e.g., server for "Store X"). The legacy POS devices 322A-322N are operatively coupled to the location system 330 and configured to receive and/or transmit data via a network (e.g., the network 108). Similarly, the location system 330 can be one or more server computers or work stations that are employed by a merchant for managing one or more legacy POS devices 332A-332N located at a second merchant location (e.g., server for "Store Y"). The legacy POS devices 332A-332N are operatively coupled to the location system 330 and configured to receive and/or transmit data via a network (e.g., the network 108). Lastly, the location system 340 can be one or more server computers or work stations that are employed by a merchant for managing data of one or more legacy POS devices 342A-342N located at a third merchant location (e.g., server for "Store Z"). The legacy POS devices 342A-342N are operatively coupled to the location system 330 and configured to receive and/or transmit data via a network (e.g., the network 108). Note that in other embodiments, there can be more than three location systems based on, for example, a number of merchant stores/locations of the merchant's business.

In one example, a particular legacy POS device 322 can receive up-to-date inventory data and pricing bundle data from the location system 330, which has that data from the POS database system 310. The particular legacy POS device 322 can also transmit data to the location system 330 to report purchase transactions processed at the legacy POS device 322. Such transmission can be periodically (e.g., daily, weekly, monthly, etc.), where the time period can be configured by an operator of the particular legacy POS device 322, the POS database system 310, or a combination thereof. The location system 330, upon receiving the reported data, can transmit that data back to the POS database system 310 for updating the master copy of data for effective operation of the merchant's business. For example, each of the legacy POS devices 322A-322N transmits sales information (e.g., post-transaction data) at the end of every business day to the location system 330, thereby enabling the location system 330 to have up-to-date information at, e.g., "Store X". The location system 330, along with the location systems 340 and 350, can each forward that information from their respective legacy POS devices to the POS database system 310. The POS database system 310 in turn, can update its inventory data based on the transactions that have been processed across all of the legacy POS devices 322A-322N, 332A-332N, and 342A-342N.

In some embodiments, based on the information received from the location systems 330, 340, and 350, the POS database system 310 and/or another component or server system associated with the legacy merchant system 300 can reconfigure the bundle pricing rules. For example, based on inventory updates received from the location systems 330, 340, and 350, the legacy merchant system 300 identifies that items A, B, and C are unpopular items (e.g., based on a low number of units sold for a long period of time). In response, the legacy merchant system 300 can compute new pricing bundle rules to help increase sales of those items. In one example, a pricing bundle rule is generated to specify a discount for a bundle of three or more of item A being purchased together. In another example, an existing pricing bundle rule (e.g., specifying a discount for a bundle of items A and B) is updated to specify a discount for bundling item A with popular items E and F. In yet another example, a pricing bundle rule specifies a discount for a bundle of items A, B, and C. The newly generated bundle pricing rules and/or updated pricing bundle rules can be transmitted by the POS database system 310 to the location systems 320, 330, and 340, which can distribute, respectively, the rules to the legacy POS devices 322A-322N, 332A-332N, and 342A-342N.

In some embodiments, a adapter module installed at the POS database system 310 can also transmit newly generated pricing bundle rules and/or updated pricing bundle rules to a payment processing engine. The payment processing engine, in turn, can push that data to the POS devices (i.e., non-legacy devices not in communication with the legacy merchant system 300), thereby enabling those POS devices to have the same up-to-date information as the legacy POS devices 322A-322N, 332A-332N, and 342A-342N. In some embodiments, the payment processing engine indirectly transmits that data by communicating it to a payment processing database system, which transmits the data to the POS devices.

Figure 4:
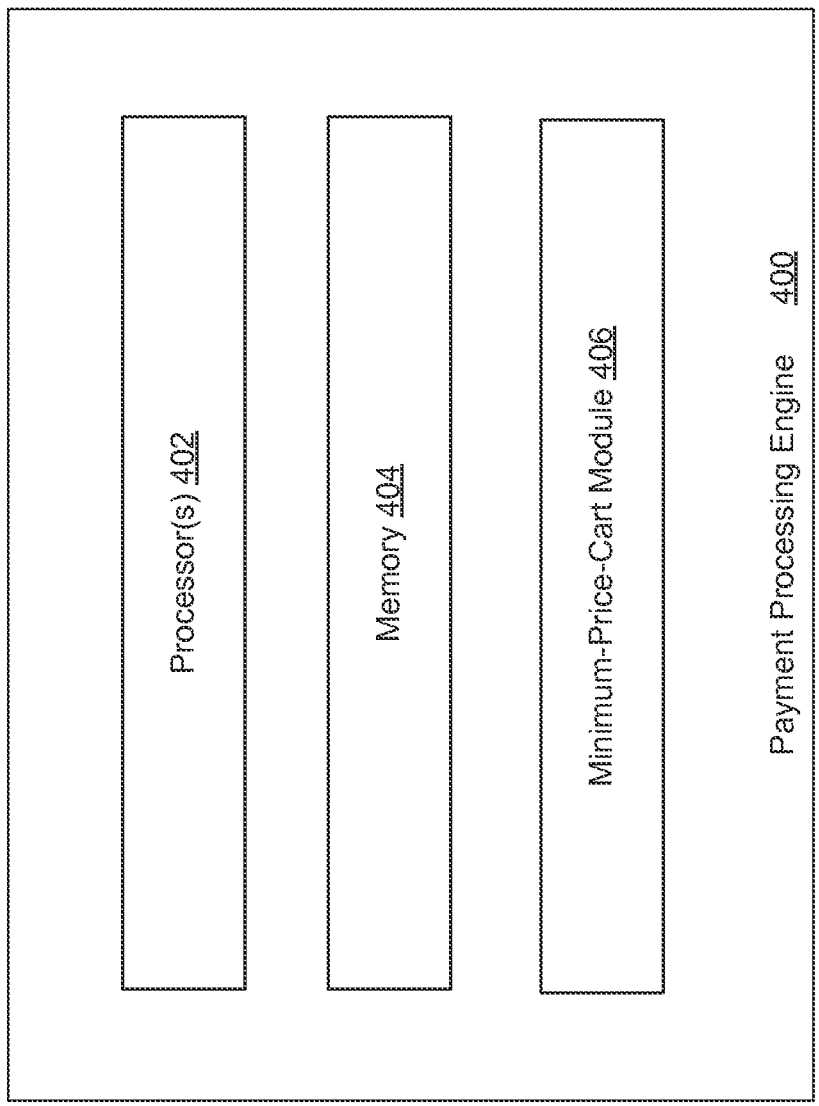
FIG. 4 illustrates various components of a payment processing engine.

FIG. 4 illustrates various components of a payment processing engine 400 that can be used in accordance with some embodiments of the inventory management technology. According to the embodiments shown in FIG. 4, the payment processing engine 400 can include one or more processors 402, a memory 404, and a minimum-price cart module 406. Other embodiments of the inventory management technology can include some, all, or none of these modules and components along with other modules, applications, and/or components. Still yet, some embodiments can incorporate two or more of these modules and components into a single module and/or associate a portion of the functionality of one or more of these modules with a different module.

The memory 404 can be any device, mechanism, or populated data structure used for storing information. In some embodiments of the inventory management technology, the memory 404 can be or include any type of, but is not limited to, volatile memory, nonvolatile memory and dynamic memory. In some embodiments, the memory 404 can be or include one or more disk drives, flash drives, one or more databases, and/or the like. In some embodiments, the memory 404 can include one or more tables, one or more files, local cache memories, processor cache memories, relational databases, and/or the like. In some embodiments, the memory 404 can be used to store instructions for executing, or running, one or more applications or modules on the processor(s) 402. For example, the memory 404 could be used in various embodiments to house all or some of the instructions needed to execute the functionality of the minimum-price cart module 410.

The minimum-price cart module is configured to determine one or more minimum-price carts based on the discount bundle rules received from a legacy merchant system (e.g., the merchant system 110 of FIG. 1 or the merchant system 210 of FIG. 2). A minimum-price cart is a revised version of the virtual shopping cart that includes discounted pricings applied to eligible items in the virtual shopping cart. Accordingly, the minimum-price cart includes a discount pricing bundle that has been selected based on certain transaction items in the cart that are eligible for a discount based on those items being bundled together. In some embodiments, the minimum-price cart module 410 determines a particular minimum-price cart for a customer by determining a set of one or more potential bundles for each item in the shopping cart. The minimum-price cart module 410 determines each potential bundle by looking at an availability of a bundle-necessary item that is present, or selected, in the shopping cart. For example, for item X, a potential pricing bundle exists (i.e., potential discount) if an item Y is also present in the cart, as that potential bundle specifies that when item X and item Y are bought together, a discount of $5 can be taken off each item's price. In this example, item Y is the bundle-necessary item for item X (i.e., if item X were being analyzed first).

Next, the minimum-price cart module 410 determines for the item a maximum potential pricing discount that results when all of the determined potential bundles are applied to the item. Based on the maximum potential pricing discount for each item, the minimum-price cart module 410 can generate and assign a ranking for each item. Based on the ranking, the minimum-price cart module 410 selects a particular bundle as the minimum-price cart; for example, the minimum-price cart module 410 may select the highest ranked potential bundle.

Referring back to the example above, item X can qualify for other pricing bundles that does not involve Shirt Y, one of which provides a potential discount of $5 off the price of item X. The bundle with item Y, on the other hand, offers only a $2 off the price of item X. As such, the bundle without item Y is selected for item X. However, for item Y, of all its potential bundles, the bundling with item X provides the maximum potential discount of $10 off the price of item Y. Accordingly, the bundle of item Y and item X is ranked the highest based on those items' respective maximum potential discounts. As a result, the bundle involving item X and item Y is selected as the minimum-price cart for the customer.

In some embodiments, the minimum-price cart module 410 transmits the generated minimum-price cart to the particular POS device. In other embodiments, the generated minimum-price cart is transmitted first to the PPDS, which then forwards it to the particular POS device. In some embodiments, the generated minimum-price cart is transmitted by the inventory communication module 406. In other embodiments, the generated minimum-price cart is transmitted by the inventory management module 408.

In some embodiments, the minimum-price cart module 410 pre-computes a plurality of minimum-price carts without receiving a request from a particular POS device. In such embodiments, the precomputed minimum-price carts are transmitted to all of the POS devices in communication with the payment processing engine 400 to enable the devices to perform on-the-fly determination of a particular minimum-price cart. The pre-computed minimum-price carts can be an index of minimum-price carts that can be accessed relatively quickly as needed. A POS device can store the index locally for on-the-fly access as needed. For example, for a particular transaction taking place in real-time, the particular POS device can simply access the locally stored index to identify a minimum-price cart that is applicable to that transaction. As a result, the POS device can simply generate its own minimum-price cart without sending a request to the payment processing engine 300 (directly or indirectly via the payment processing database system), and without having to do heavy computations to obtain that minimum-price cart due to the pre-computed minimum-price carts.

Figure 5:
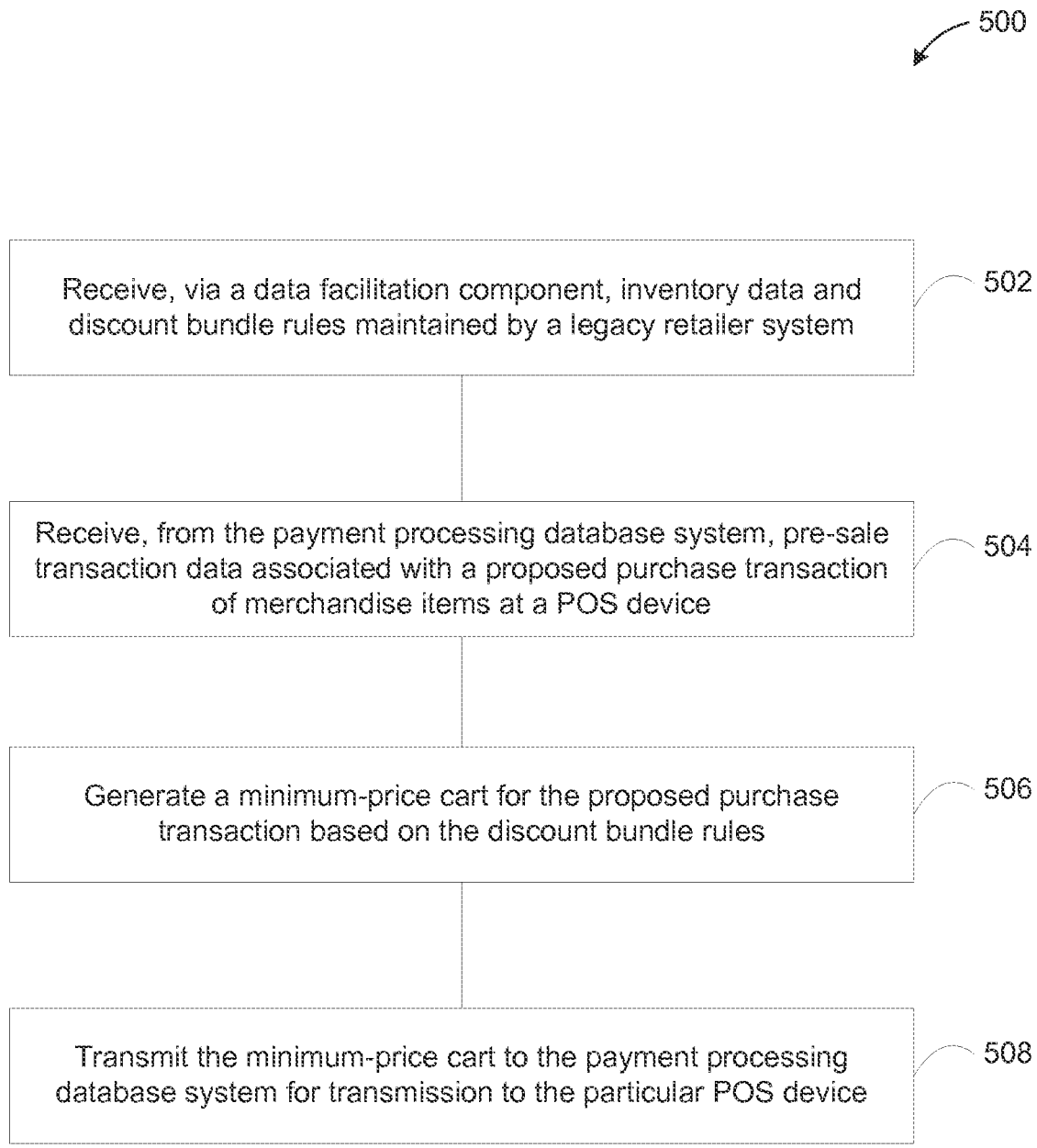
FIG. 5 is a flowchart illustrating a set of operations for generating a minimum-price cart for a transaction.

FIG. 5 is a flowchart illustrating a set of operations 500 for generating a minimum-price cart for a transaction in accordance with some embodiments of the inventory management technology. In some embodiments, the set of operations 500 can be executed by a payment processing engine (e.g., the payment processing engine 224 of FIG. 2).

At operation 502, the payment processing engine receives inventory data and discount bundle data from a legacy retailer system (e.g., the legacy merchant system 110 of FIG. 1). The inventory data includes up-to-date information about merchandise available in inventory of the retailer. The discount bundle data includes discount bundle rules specifying discount pricings for inventory items purchased in bundles in proposed purchase of customers (e.g., virtual shopping carts). The inventory data and the discount bundle data are received via an adapter module installed at the legacy retailer system. The adapter module is associated with a payment processing service that facilitates transactions at POS devices on behalf of the legacy retailer system. Note that these POS devices are non-legacy POS devices that are not integrated with the legacy retailer system, where communication between the adapter module and the payment processing engine advantageously enables the legacy retailer system to communicate with these POS devices.

At operation 504, the payment processing engine receives pre-sale transaction data associated with a proposed purchase transaction occurring at a POS device facilitated by the payment processing service. The pre-sale transaction data includes information about a set of one or more inventory items in a particular customer shopping cart associated with the proposed purchase transaction. In some embodiments, the pre-sale transaction data (or pre-transaction data) can be included in a minimum-price cart request message that requests a minimum-price cart to be generated for the proposed purchase transaction. In some embodiments, the request message can be sent from the POS device directly to the payment processing engine via a network (e.g., the network 108 of FIG. 1). In some embodiments, the POS device is configured to automatically send the pre-transaction data without it being a request to the payment processing engine, which in turn responds with a generated minimum-price cart for the POS device. In some embodiments, the request message for the minimum-price cart is sent via the network first to a payment processing database system, which in turn communicates the request to the payment processing engine via the network. In such embodiments, the POS device may simply be configured to automatically send the pre-transaction data to the payment processing database system with every proposed purchase transaction. The payment processing database system, which, in turn, generates the request message on behalf of the POS device for transmission to the payment processing engine.

At operation 506, the payment processing engine generates a minimum-price cart for the proposed purchase transaction based on the discount bundle rules received from the legacy merchant system. As discussed above, generating the minimum-price cart includes determining a set of potential bundles for each item in the proposed purchase transaction, determining, for each item, a maximum potential pricing discount that results when all of the set of potential bundles of that item are applied to the item, generating a ranking for the item based on the maximum potential pricing discount, and selecting, based on the ranking, a particular bundle, from the set of potential bundles, for each item to generate the first minimum-price cart.

At operation 508, the payment processing engine transmits via the network the generated minimum-price cart to the payment processing database system for transmission to the POS device. In some embodiments, the payment processing engine transmits the generated minimum-price cart directly to the POS device via the network.

Figure 6:
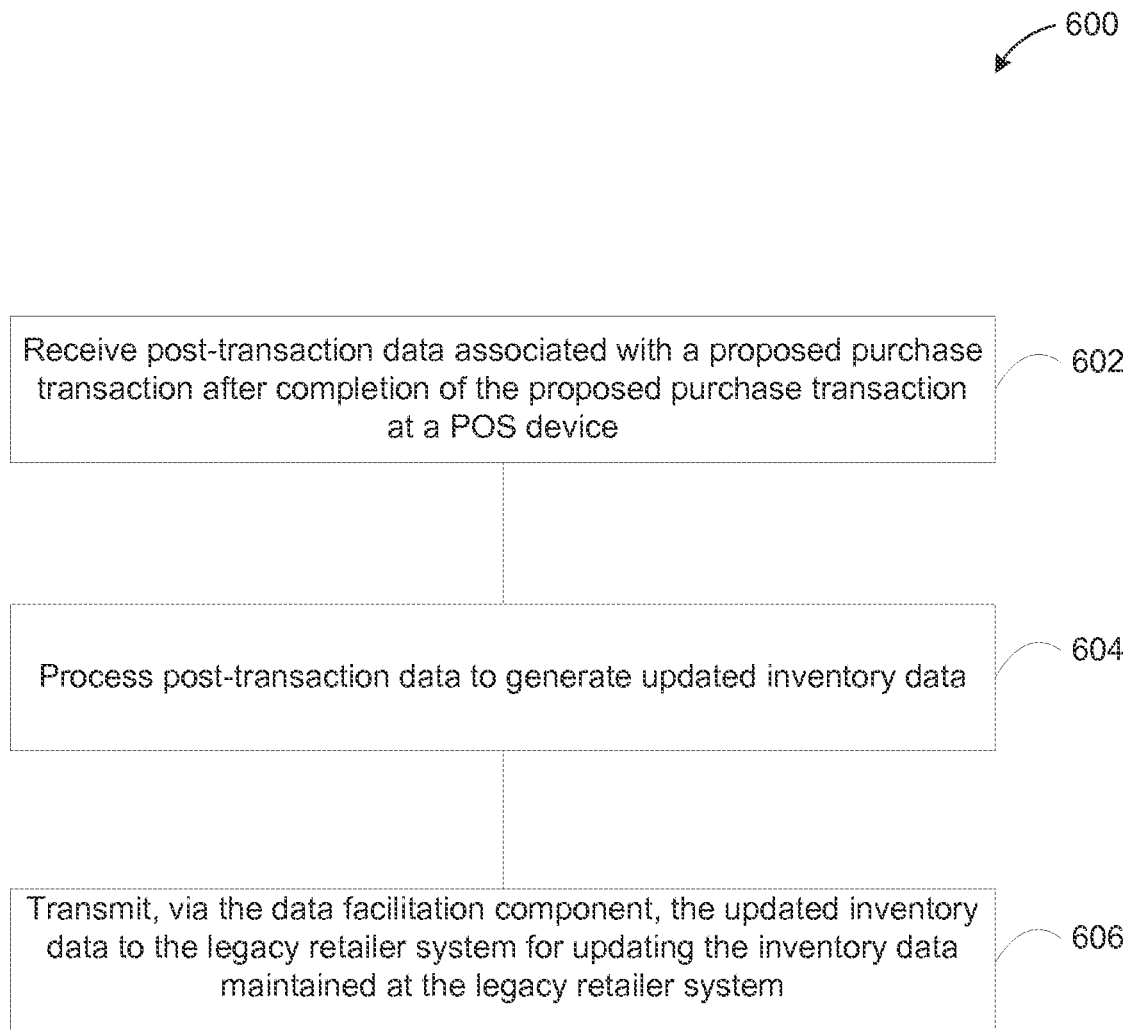
FIG. 6 is a flowchart illustrating a set of operations for updating inventory after completion of a transaction.

FIG. 6 is a flowchart 600 illustrating a set of operations 600 for updating inventory after completion of a transaction in accordance with some embodiments of the inventory management technology. In some embodiments, the set of operations 600 can be executed by a payment processing engine (e.g., the payment processing engine 224 of FIG. 2).

At operation 602, the payment processing engine receives post-transaction data associated with a proposed purchase transaction that has completed at a POS device. The post-transaction data includes information on the purchase of inventory items that has completed at the POS device (e.g., credit card payment and authorization for the purchase). In some embodiments, the POS device is configured to transmit the post-transaction data directly to the payment processing engine. In some embodiments, the POS device transmits the post-transaction data to the payment processing database system, which forwards the data to the payment processing engine. As discussed above, the POS device is managed by the payment processing database system that is associated with a payment processing service. The payment processing database system is employed by the payment processing service to facilitate transactions occurring at the POS device on behalf of the legacy retailer system, which is not technologically integrated with the POS device. The payment processing engine is also employed by the payment processing service. The payment processing engine bridges communication between the payment processing database system and the legacy retailer system through communication via the adapter module.

At operation 604, the payment processing engine processes the post-transaction data to generate updated inventory data based on the completed purchase transaction at the POS device. In some embodiments, processing the post-transaction data includes analyzing information in the post-transaction data (e.g., parsing) and compiling the analyzed information into a file that contains updated inventory data. The file can be, for example, an Excel® file or any form of relational database file. At operation 606, the payment processing engine transmits the updated inventory data to the legacy retailer system through communication with the adapter module. In particular, the updated inventory data is transmitted to the adapter module, which communicates the updated inventory data to a POS database system of the legacy retailer system to enable the POS database system to update its "master" copy of inventory data. In some embodiments, as discussed above in reference to FIG. 3, the POS database system transmits a new copy of the inventory data (i.e., an updated version) to the legacy POS devices.

Regarding the sets of operations 500 and 600, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

FIG. 7A illustrates an example of a graphical user interface (GUI) 700A ("GUI 700A") for a customer's virtual shopping cart 702 before bundle pricing rules are applied. The GUI 700A can be generated by a POS device associated with a PPS (e.g., PPS 120 of FIG. 1). The GUI 700A displays details 704 about items in a proposed purchase of a customer in the virtual shopping cart 702. The details 704 include, for example, item name, item description, item price, and item quantity. The GUI 700A also displays an action button 706 ("Verify Cart") that is configured to trigger a request for a minimum-price cart to be applied to the items in the virtual shopping cart 702. A sales employee, for example, can select the action button 706. In response, a request is sent to the payment processing engine to generate the minimum-price cart. In some embodiments, the request is sent to a payment processing database system which forwards the request to the payment processing engine. In some embodiments, selection of the action button 706 triggers the POS device itself to generate the minimum-price cart.

FIG. 7B illustrates an example of a graphical user interface (GUI) 700B ("GUI 700B") for a customer's virtual shopping cart 702 after bundle pricing rules are applied. The GUI 700B displays the details 704 about the items in the customer's proposed purchase, in addition to discounts 708 applied to eligible items. The discounts 708 are applied as a result of the minimum-price cart generated for the virtual shopping cart 702. The GUI 700B also displays an action button 708 ("Check Out") to accept the applied discounts (i.e., the minimum-price cart) and/or finalize the proposed purchase. For example, the sales employee, can select the action button 708 to trigger the display of a new GUI (e.g., "Check-Out" screen) requesting for payment information (e.g., swipe credit card). In some embodiments, as discussed above, upon completion of the transaction, the POS device transmits post-transaction data to the payment processing database system for updating inventory data of the merchant.

Figure 8:
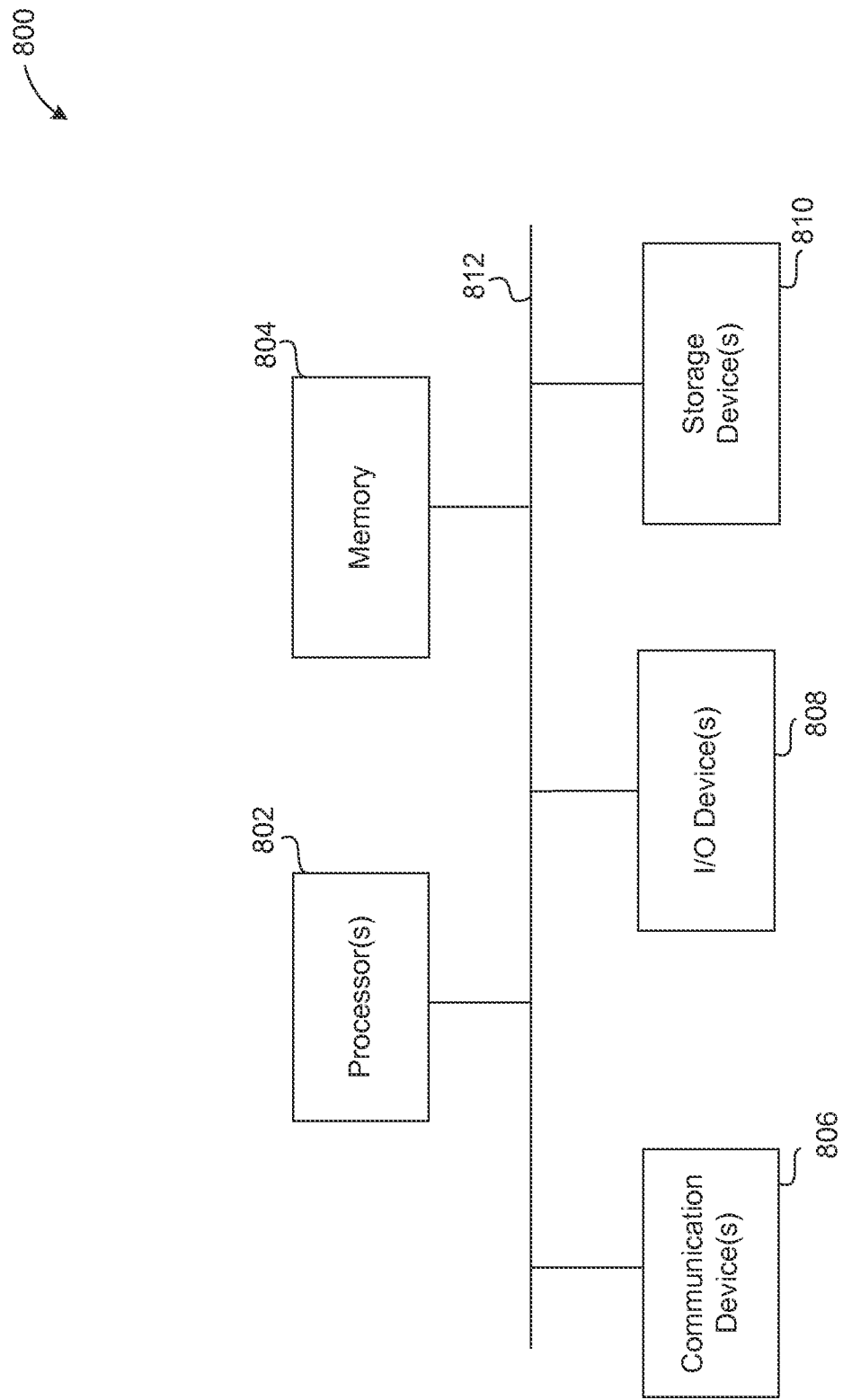
FIG. 8 illustrates an example of a processing computer system.

FIG. 8 illustrates at a high-level an example of the hardware architecture of a processing system 800 that can be used to implement any of the computing devices referred to above, such as a client device, the legacy merchant system, the PPS system, the payment processing engine, etc. Any of these devices each can include multiple instances of an architecture such as shown in FIG. 8 (i.e., multiple computers), particularly server-based systems, and such multiple instances can be coupled to each other via one or more networks.

In the illustrated embodiment, the processing system 800 includes one or more processors 802, memory 804, one or more communication device(s) 806, one or more input/output (I/O) devices 808, and one or more mass storage devices 810, all of which are coupled to one another through an interconnect 812. The interconnect 812 may be or include one or more buses, point-to-point connections, controllers, adapters and/or other conventional connection devices.

The processor(s) 802 can be or include, for example, one or more general-purpose programmable microprocessors, digital signal processors (DSPs), microcontrollers, application specific integrated circuits (ASICs), programmable gate arrays, or the like, or a combination of such devices. The processor(s) 802 control the overall operation of the processing device 800.

Memory 804 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device (s) 810 may be or include one or more hard drives, digital versatile disks (DVDs), flash memories, or the like. The memory 804 and/or the mass storage device(s) 810 can store (individually or collectively) data and instructions that configure the processor(s) 802 to execute operations in accordance with the techniques described above.

The communication devices 806 can be or include, for example, an Ethernet adapter, cable modem, Wi-Fi adapter, cellular transceiver, Bluetooth or Bluetooth Low Energy (BLE) transceiver, or the like, or a combination thereof. For example, in the case of a client device, the communication devices 806 can be or include, for example, a cellular telecommunications transceiver (e.g., 3G or 4G/LTE), Wi-Fi transceiver, Bluetooth or BLE transceiver, or the like, or a combination thereof.

Depending on the specific nature and purpose of the processing device 800, the I/O devices 808 can include devices such as a display (which may be a touch screen display), audio speaker, keyboard, mouse or other pointing device, microphone, camera, etc. Note that these I/O devices may be unnecessary, however, if the processing device 800 is embodied solely as a server computer.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

What is claimed is:

1. A system comprising:
a payment processing database system operated by a payment processing service, the payment processing service having one or more non-transitory computer-readable media storing instructions executable by one or more processors of the payment processing service, wherein the instructions program the one or more processors to perform acts including:
   facilitating, on behalf of a retailer service, processing of customer merchandise purchases conducted at multiple point-of-sale (POS) devices, the multiple POS devices located at physical retailer locations of the retailer service, the retailer service utilizing a legacy retailer POS system to maintain inventory data of merchandise items and discount bundle rules associated with the merchandise items, the discount bundle rules specifying discount pricings for merchandise items purchased in bundles in customer virtual shopping carts;
   configuring the payment processing database system to receive data associated with the customer merchandise purchases occurring at the multiple POS devices, the data including pre-sale transaction data and post-sale transaction data, wherein the payment processing database system operates remotely from the legacy retailer POS system;
   configuring an adapter module installed at the legacy retailer POS system and associated with the payment processing service, to operate as an adapter for retrieving and transmitting the inventory data and the discount bundle rules from the legacy retailer POS system to remote systems; and
   configuring a payment processing engine operatively coupled to the adapter module and the payment processing database system to operate as a communication bridge between the adapter module and the payment processing database system to enable communication with the legacy retailer POS system, wherein the payment processing engine is configured to:
      receive, via the adapter module, the inventory data and the discount bundle rules from the legacy retailer POS system, thereby enabling the payment processing engine to have up-to-date information about the merchandise items;
      receive, from the payment processing database system, particular pre-sale transaction data associated with a proposed purchase transaction occurring at a particular POS device of the multiple POS devices, the particular pre-sale transaction data including information about a set of merchandise items in a particular customer virtual shopping cart associated with the proposed purchase transaction, wherein the particular customer virtual shopping cart comprises merchandise items selected in the proposed purchase transaction at the particular POS device;
      determine a minimum-price cart for the proposed purchase transaction based on the discount bundle rules received from the legacy retailer POS system, wherein the minimum-price cart includes a discount pricing bundle for a bundle of eligible items from the set of merchandise items in the particular customer virtual shopping cart;
      transmit the minimum-price cart to the payment processing database system for transmission to the particular POS device;
      receive, from the payment processing database system, post-transaction data after completion of the proposed purchase transaction, the post-transaction data including information about a set of purchased merchandise items purchased in the proposed purchase transaction;
      generate updated inventory data based on the post-transaction data received from the payment processing database system and the inventory data received from the legacy retailer POS system;
      transmit, via the adapter module, the updated inventory data to the legacy retailer POS system for updating the inventory data; and
      transmit the updated inventory data to the payment processing database system; and
   further configuring the payment processing database system to distribute the updated inventory data received from the payment processing engine to the multiple POS devices as up-to-date inventory information about the merchandise items.

2. The system of claim 1,
wherein the legacy retailer POS system includes multiple legacy POS devices, the legacy retailer POS system having one or more second non-transitory computer-readable media storing second instructions executable by one or more second processors of the legacy retailer POS system, wherein the second instructions program the one or more second processors to perform second acts including:
   managing legacy customer merchandise purchases occurring at the multiple legacy POS devices on behalf of the retailer service;
   receiving additional post-transaction data associated with the legacy customer merchandise purchases; and
   updating the inventory data maintained at the legacy retailer POS system based on the additional post-transaction data associated with the legacy customer merchandise purchases,
   wherein the adapter module is further configured to transmit the inventory data to the payment processing engine based on updates by the legacy retailer POS system.

3. The system of claim 1, wherein the payment processing database system is a datacenter, the adapter module is a data facilitation application executing on the legacy retailer POS system, the payment processing engine is a payment processing application executing on a cloud-based computing system, and each of the multiple POS devices is a mobile computing device.

4. A method implemented at least in part by one or more servers associated with a payment processing service that processes transactions on behalf of a merchant, the method comprising:

facilitating, on behalf of a retailer service, processing of customer merchandise purchases conducted at multiple point-of-sale (POS) devices, the multiple POS devices located at physical retailer locations of the retailer service, the retailer service utilizing a legacy retailer POS system to maintain inventory data of merchandise items and discount bundle rules associated with the merchandise items, the discount bundle rules specifying discount pricings for merchandise items purchased in bundles in customer virtual shopping carts;

configuring a payment processing database system to receive data associated with the customer merchandise purchases occurring at the multiple POS devices, the data including pre-sale transaction data and post-sale transaction data, wherein the payment processing database system operates remotely from the legacy retailer POS system;

configuring an adapter module installed at the legacy retailer POS system and associated with the payment processing service, to operate as an adapter for retrieving and transmitting the inventory data and the discount bundle rules from the legacy retailer POS system to remote systems; and configuring a payment processing engine operatively coupled to the adapter module and the payment processing database system to operate as a communication bridge between the adapter module and the payment processing database system to enable communication with the legacy retailer POS system, wherein the payment processing engine is configured to:

receive, via the adapter module, the inventory data and the discount bundle rules from the legacy retailer POS system, thereby enabling the payment processing engine to have up-to-date information about the merchandise items;

receive, from the payment processing database system, particular pre-sale transaction data associated with a proposed purchase transaction occurring at a particular POS device of the multiple POS devices, the particular pre-sale transaction data including information about a set of merchandise items in a particular customer virtual shopping cart associated with the proposed purchase transaction, wherein the particular customer virtual shopping cart comprises merchandise items selected in the proposed purchase transaction at the particular POS device;

determine a minimum-price cart for the proposed purchase transaction based on the discount bundle rules received from the legacy retailer POS system, wherein the minimum-price cart includes a discount pricing bundle for a bundle of eligible items from the set of merchandise items in the particular customer virtual shopping cart;

transmit the minimum-price cart to the payment processing database system for transmission to the particular POS device;

receive, from the payment processing database system, post-transaction data after completion of the proposed purchase transaction, the post-transaction data including information about a set of purchased merchandise items purchased in the proposed purchase transaction;

generate updated inventory data based on the post-transaction data received from the payment processing database system and the inventory data received from the legacy retailer POS system;

transmit, via the adapter module, the updated inventory data to the legacy retailer POS system for updating the inventory data; and transmit the updated inventory data to the payment processing database system; and further configuring the payment processing database system to distribute the updated inventory data received from the payment processing engine to the multiple POS devices as up-to-date inventory information about the merchandise items.

5. The method of claim 4, wherein the legacy retailer POS system includes multiple legacy POS devices, the legacy retailer POS system having one or more second non-transitory computer-readable media storing second instructions executable by one or more second processors of the legacy retailer POS system, wherein the second instructions program the one or more second processors to perform second acts including:

managing legacy customer merchandise purchases occurring at the multiple legacy POS devices on behalf of the retailer service;

receiving additional post-transaction data associated with the legacy customer merchandise purchases; and updating the inventory data maintained at the legacy retailer POS system based on the additional post-transaction data associated with the legacy customer merchandise purchases, wherein the adapter module is further configured to transmit the inventory data to the payment processing engine based on updates by the legacy retailer POS system.

6. The method of claim 4, wherein the payment processing database system is a datacenter, the adapter module is a data facilitation application executing on the legacy retailer POS system, the payment processing engine is a payment processing application executing on a cloud-based computing system, and each of the multiple POS devices is a mobile computing device.

7. One or more non-transitory computer-readable media storing instructions executable by one or more processors, wherein the instructions program the one or more processors to implement a service to:

facilitate, on behalf of a retailer service, processing of customer merchandise purchases conducted at multiple point-of-sale (POS) devices, the multiple POS devices located at physical retailer locations of the retailer service, the retailer service utilizing a legacy retailer POS system to maintain inventory data of merchandise items and discount bundle rules associated with the merchandise items, the discount bundle rules specifying discount pricings for merchandise items purchased in bundles in customer virtual shopping carts;

configure a payment processing database system to receive data associated with the customer merchandise purchases occurring at the multiple POS devices, the data including pre-sale transaction data and post-sale transaction data, wherein the payment processing database system operates remotely from the legacy retailer POS system;

configure an adapter module installed at the legacy retailer POS system and associated with the payment processing service, to operate as an adapter for retrieving and transmitting the inventory data and the discount bundle rules from the legacy retailer POS system to remote systems; and configure a payment processing engine operatively coupled to the adapter module and the payment processing database system to operate as a communication bridge between the adapter module and the payment processing database system to enable communication with the legacy retailer POS system, wherein the payment processing engine is configured to:
receive, via the adapter module, the inventory data and the discount bundle rules from the legacy retailer POS system, thereby enabling the payment processing engine to have up-to-date information about the merchandise items;
receive, from the payment processing database system, particular pre-sale transaction data associated with a proposed purchase transaction occurring at a particular POS device of the multiple POS devices, the particular pre-sale transaction data including information about a set of merchandise items in a particular customer virtual shopping cart associated with the proposed purchase transaction, wherein the particular customer virtual shopping cart comprises merchandise items selected in the proposed purchase transaction at the particular POS device;
determine a minimum-price cart for the proposed purchase transaction based on the discount bundle rules received from the legacy retailer POS system, wherein the minimum-price cart includes a discount pricing bundle for a bundle of eligible items from the set of merchandise items in the particular customer virtual shopping cart;
transmit the minimum-price cart to the payment processing database system for transmission to the particular POS device;
receive, from the payment processing database system, post-transaction data after completion of the proposed purchase transaction, the post-transaction data including information about a set of purchased merchandise items purchased in the proposed purchase transaction;
generate updated inventory data based on the post-transaction data received from the payment processing database system and the inventory data received from the legacy retailer POS system;
transmit, via the adapter module, the updated inventory data to the legacy retailer POS system for updating the inventory data; and
transmit the updated inventory data to the payment processing database system; and
further configure the payment processing database system to distribute the updated inventory data received from the payment processing engine to the multiple POS devices as up-to-date inventory information about the merchandise items.

8. The one or more non-transitory computer-readable media of claim 7, wherein the legacy retailer POS system includes multiple legacy POS devices, the legacy retailer POS system having one or more second non-transitory computer-readable media storing second instructions executable by one or more second processors of the legacy retailer POS system, wherein the second instructions program the one or more second processors to perform second acts including:
managing legacy customer merchandise purchases occurring at the multiple legacy POS devices on behalf of the retailer service;
receiving additional post-transaction data associated with the legacy customer merchandise purchases; and
updating the inventory data maintained at the legacy retailer POS system based on the additional post-transaction data associated with the legacy customer merchandise purchases,
wherein the adapter module is further configured to transmit the inventory data to the payment processing engine based on updates by the legacy retailer POS system.

9. The one or more non-transitory computer-readable media of claim 7, wherein the payment processing database system is a datacenter, the adapter module is a data facilitation application executing on the legacy retailer POS system, the payment processing engine is a payment processing application executing on a cloud-based computing system, and each of the multiple POS devices is a mobile computing device.

* * * * *